(12) United States Patent
Sullam et al.

(10) Patent No.: US 9,612,987 B2
(45) Date of Patent: Apr. 4, 2017

(54) DYNAMICALLY RECONFIGURABLE ANALOG ROUTING CIRCUITS AND METHODS FOR SYSTEM ON A CHIP

(75) Inventors: Bert Sullam, Bellevue, WA (US); Harold Kutz, Edmonds, WA (US); Timothy Williams, Bellevue, WA (US); James Shutt, Seattle, WA (US); Bruce E. Byrkett, Preston, WA (US); Melany Ann Richmond, Ellensburg, WA (US); Nathan Kohagen, Seattle, WA (US); Mark Hastings, Mukilteo, WA (US); Eashwar Thiagarajan, Bothell, WA (US); Warren Snyder, Snohomish, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 414 days.

(21) Appl. No.: 12/776,323

(22) Filed: May 7, 2010

(65) Prior Publication Data

US 2011/0026519 A1    Feb. 3, 2011

Related U.S. Application Data

(60) Provisional application No. 61/176,905, filed on May 9, 2009.

(51) Int. Cl.
*H04L 12/50* (2006.01)
*G06F 13/40* (2006.01)

(52) U.S. Cl.
CPC .. *G06F 13/4022* (2013.01); *G06F 2213/0038* (2013.01)

(58) Field of Classification Search
CPC .......... G06F 1/08; G06F 1/32; G06F 15/7867; G06F 13/102; G06F 13/40; G06F 9/44505; G06G 7/06; H03B 5/364; H03K 3/012; H03K 3/014; H03K 3/02315; H03H 19/004
See application file for complete search history.

(56) References Cited

U.S. PATENT DOCUMENTS

| | | |
|---|---|---|
| 736,005 A | 8/1903 | Peak |
| 4,543,707 A | 10/1985 | Ito et al. |
| 5,079,451 A | 1/1992 | Gudger et al. |
| 5,412,261 A | 5/1995 | Whitten |
| 5,563,526 A | 10/1996 | Hastings et al. |

(Continued)

FOREIGN PATENT DOCUMENTS

| | | |
|---|---|---|
| EP | 0871223 A | 10/1998 |
| EP | 1713252 A | 10/2006 |

OTHER PUBLICATIONS

US 5,424,568, 06/1995, Dobbelaere et al. (withdrawn)

(Continued)

*Primary Examiner* — Anez Ebrahim

(57) ABSTRACT

An integrated circuit device may include a reconfigurable analog signal switching fabric comprising a plurality of global buses that are selectively connected to external pins by pin connection circuits in response to changeable analog routing data, and a plurality of local buses that are selectively connected to analog blocks and/or global buses by routing connection circuits in response to the analog routing data; and at least one processor circuit that executes predetermined operations in response to instruction data.

19 Claims, 15 Drawing Sheets

(56) References Cited

U.S. PATENT DOCUMENTS

| | | | |
|---|---|---|---|
| 5,598,408 A | 1/1997 | Nickolls et al. | |
| 5,604,450 A | 2/1997 | Borkar et al. | |
| 5,625,301 A | 4/1997 | Plants et al. | |
| 5,625,870 A | 4/1997 | Moon | |
| 5,635,745 A | 6/1997 | Hoeld | |
| 5,671,432 A | 9/1997 | Bertolet et al. | |
| 5,748,875 A | 5/1998 | Tzori | |
| 5,778,439 A | 7/1998 | Trimberger et al. | |
| 5,862,148 A | 1/1999 | Typaldos et al. | |
| 5,877,633 A | 3/1999 | Ng et al. | |
| 5,894,565 A | 4/1999 | Furtek et al. | |
| 5,903,912 A | 5/1999 | Hansen | |
| 5,966,047 A | 10/1999 | Anderson et al. | |
| 6,072,334 A | 6/2000 | Chang | |
| 6,157,426 A | 12/2000 | Gu | |
| 6,161,199 A | 12/2000 | Szeto et al. | |
| 6,246,259 B1 | 6/2001 | Zaliznyak et al. | |
| 6,311,292 B1 | 10/2001 | Choquette et al. | |
| 6,314,530 B1 | 11/2001 | Mann | |
| 6,415,348 B1 | 7/2002 | Mergard et al. | |
| 6,424,175 B1 | 7/2002 | Vangal et al. | |
| 6,445,030 B1 | 9/2002 | Wu et al. | |
| 6,453,422 B1 | 9/2002 | Dabral et al. | |
| 6,460,172 B1 | 10/2002 | Insenser Farre et al. | |
| 6,461,899 B1 | 10/2002 | Kitakado et al. | |
| 6,477,606 B1 | 11/2002 | Kawamura et al. | |
| 6,583,652 B1 | 6/2003 | Klein et al. | |
| 6,639,426 B2 | 10/2003 | Haycock et al. | |
| 6,701,340 B1 | 3/2004 | Gorecki et al. | |
| 6,709,928 B1 | 3/2004 | Jenne et al. | |
| 6,724,220 B1 | 4/2004 | Snyder et al. | |
| 6,738,415 B2 | 5/2004 | Drost et al. | |
| 6,791,356 B2 | 9/2004 | Haycock et al. | |
| 6,792,527 B1 | 9/2004 | Allegrucci | |
| 6,818,558 B1 | 11/2004 | Rathor et al. | |
| 6,826,717 B1 | 11/2004 | Draper et al. | |
| 6,842,865 B2 | 1/2005 | Nee et al. | |
| 6,862,642 B1 | 3/2005 | Packer et al. | |
| 6,895,530 B2 | 5/2005 | Moyer et al. | |
| 6,915,416 B2 | 7/2005 | Deng et al. | |
| 6,958,511 B1 | 10/2005 | Halliyal et al. | |
| 6,971,004 B1 | 11/2005 | Pleis et al. | |
| 6,972,597 B2 | 12/2005 | Kim | |
| 6,981,090 B1 | 12/2005 | Kutz et al. | |
| 6,996,796 B2 | 2/2006 | Sanchez et al. | |
| 7,046,035 B2 | 5/2006 | Piasecki et al. | |
| 7,133,945 B2 | 11/2006 | Lau | |
| 7,173,347 B2 | 2/2007 | Tani et al. | |
| 7,212,189 B2 | 5/2007 | Shaw et al | |
| 7,221,187 B1 | 5/2007 | Snyder et al. | |
| 7,266,632 B2 | 9/2007 | Dao et al. | |
| 7,287,112 B1 | 10/2007 | Pleis et al. | |
| 7,299,307 B1 | 11/2007 | Early et al. | |
| 7,308,608 B1 | 12/2007 | Pleis et al. | |
| 7,340,693 B2 | 3/2008 | Martin et al. | |
| 7,360,005 B2 | 4/2008 | Lin | |
| 7,375,417 B2 | 5/2008 | Tran | |
| 7,393,699 B2 | 7/2008 | Tran | |
| 7,417,459 B2 | 8/2008 | Wilson et al. | |
| 7,436,207 B2 | 10/2008 | Rogers et al. | |
| 7,450,423 B2 | 11/2008 | Lai et al. | |
| 7,552,415 B2 | 6/2009 | Sanchez et al. | |
| 7,581,076 B2* | 8/2009 | Vorbach | 711/202 |
| 7,584,456 B1 | 9/2009 | Veenstra et al. | |
| 7,603,578 B2 | 10/2009 | Balasubramanian et al. | |
| 7,609,178 B2 | 10/2009 | Son et al. | |
| 7,613,943 B2 | 11/2009 | Bakker et al. | |
| 7,630,227 B2 | 12/2009 | Tran | |
| 7,652,498 B2 | 1/2010 | Hutchings et al. | |
| 7,665,002 B1 | 2/2010 | White et al. | |
| 7,737,724 B2 | 6/2010 | Snyder et al. | |
| 7,755,412 B2 | 7/2010 | Thoma | |
| 7,865,847 B2* | 1/2011 | Master | 716/100 |
| 8,026,739 B2 | 9/2011 | Sullam et al. | |
| 8,099,618 B2* | 1/2012 | Vorbach et al. | 713/400 |
| 8,179,161 B1 | 5/2012 | Williams et al. | |
| 8,441,298 B1 | 5/2013 | Williams et al. | |
| 8,890,600 B1 | 11/2014 | Williams et al. | |
| 2002/0154878 A1 | 10/2002 | Akwani et al. | |
| 2002/0191029 A1 | 12/2002 | Gillespie et al. | |
| 2003/0014521 A1 | 1/2003 | Elson et al. | |
| 2003/0067919 A1 | 4/2003 | Qiao et al. | |
| 2003/0079152 A1 | 4/2003 | Triece | |
| 2003/0120977 A1 | 6/2003 | Tang | |
| 2003/0123307 A1 | 7/2003 | Lee et al. | |
| 2004/0113655 A1 | 6/2004 | Curd et al. | |
| 2004/0141392 A1 | 7/2004 | Lee et al. | |
| 2004/0184601 A1 | 9/2004 | Kim | |
| 2005/0066077 A1 | 3/2005 | Shibata et al. | |
| 2006/0015313 A1 | 1/2006 | Wang et al. | |
| 2006/0261401 A1 | 11/2006 | Bhattacharyya | |
| 2007/0214389 A1 | 9/2007 | Severson et al. | |
| 2008/0258203 A1 | 10/2008 | Happ et al. | |
| 2008/0258760 A1 | 10/2008 | Sullam et al. | |
| 2009/0089599 A1 | 4/2009 | Westwick et al. | |
| 2009/0309556 A1 | 12/2009 | Franco et al. | |

OTHER PUBLICATIONS

International Search Report of the International Searching Authority, dated Sep. 7, 2010 for International Application No. PCT/US2010/034185; 2 pages.

International Written Opinion of the International Searching Authority, dated Sep. 7, 2010 for International Application No. PCT/US2010/034185; 5 pages.

"PSoC Mixed-Signal Array Technical Reference Manual," Cypress Semiconductor Corporation, Oct. 14, 2008.

U.S. Appl. No. 12/496,579: "Analog Bus Sharing Using Transmission Gates," Timothy Wiliiams, filed Jul. 1, 2009; 24 pages.

U.S. Appl. No. 12/773,801 "Debug Through Power Down," Amsby Richardson Jr et al., filed May 4, 2010; 120 pages.

U.S. Appl. No. 12/774,680: "Combined Analog Architecture and Functionality in a Mixed-Sgnal Array," Kutz et al., filed May 5, 2010; 121 pages.

U.S. Appl. No. 61/077,466 "Bus Sharing Scheme," Timothy Williams et al., filed Jul. 1, 2008, 4 pages.

U.S. Appl. No. 61/175,364 "Debug Through Power Down," Amsby Richardson Jr et al., filed May 4, 2009; 10 pages.

U.S. Appl. No. 61/175,589 "Programmable Analog/Mixed Signal Architecture on a Chip, with Multiple (Programmable) Sources of Control and Multiple Means of Analog and Digital Routing, to Support Various Signal Processing Application Requirements," Harold Katz et al., filed May 5, 2009; 4 pages.

U.S. Appl. No. 61/176,905 "Dynamically Reconfigurable Analog Routing and Multiplexing Architecture on a System on Chip," Bert Sullam et al., filed May 9, 2009; 6 pages.

David C. Walter; "Verification of Analog and Mixed-Signal Circuits using Symbolic Methods:" A Dissertation Submitted to the Faculty of The University of Utah, Aug. 2007; 134 pages.

Kundert et al., "Design of Mixed-Signal Systems on Chip," IEEE Transactions on CAD, vol. 19, No. 12, Dec. 2000, pp. 1561-1572, 12 pages.

USPTO Advisory Action for U.S. Appl. No. 12/496,579 dated Aug. 4, 2011; 3 pages.

USPTO Final Rejection for U.S. Appl. No. 12/496,579 dated Jan. 24, 2012; 13 pages.

USPTO Final Rejection for U.S. Appl. No. 12/496,579 dated Jun. 7, 2011; 11 pages.

USPTO Final Rejection for U.S. Appl. No. 12/773,801 dated Jan. 23, 2013; 12 pages.

USPTO Final Rejection for U.S. Appl. No. 12/774,680 dated Aug. 3, 2011; 11 pages.

USPTO Miscellaneous Communication to Applicant-No Action Count for U.S. Appl. No. 12/496,579 dated Dec. 6, 2012; 3 pages.

USPTO Non-Finat Rejection for U.S. Appl. No. 12/496,579 dated Jan. 25, 2011; 11 pages.

USPTO Non-Final Rejection for U.S. Appl. No. 12/496,579 dated Sep. 5, 2012; 21 pages.

(56) References Cited

OTHER PUBLICATIONS

USPTO Non-Final Rejection for U.S. Appl. No. 12/496,579 dated Sep. 20, 2011; 12 pages.
USPTO Non-Final Rejection for U.S. Appl. No. 12/773,801 dated Jun. 22, 2012; 11 pages.
USPTO Non-Final Rejection for U.S. Appl. No. 12/774,680 dated Feb. 18, 2011; 8 pages.
USPTO Non-Final Rejection for U.S. Appl. No. 12/774,680 dated Jul. 10, 2012; 11 pages.
USPTO Non-Final Rejection for U.S. Appl. No. 12/774,680 dated Dec. 22, 2011; 11 pages.
USPTO Notice of Allowance for U.S. Appl. No. 12/496,579 dated Jan. 25, 2013; 5 pages.
USPTO Notice of Allowance for U.S. Appl. No. 12/498,579 dated Mar. 5, 2013; 5 pages.
USPTO Notice of Allowance for U.S. Appl. No. 12/496,579 dated Nov. 8, 2012: 7 pages.
USPTO Notice of Allowance for U.S. Appl. No. 12/496,579 dated Dec. 28, 2012, 5 pages.
USPTO Notice of Allowance for U.S. Appl. No. 12/774,680 dated Jan. 31, 2013; 7 pages.
USPTO Notice of Allowance for U.S. Appl. No. 12/774,680 dated Oct. 22, 2012; 7 pages.
USPTO Notice of Allowance for U.S. Appl. No. 12/774,680 dated Dec. 21, 2012, 7 pages.
USPTO Requirement for Restriction for U.S. Appl. No. 12/496,579 dated Nov. 30, 2010; 6 pages.
SIPO Chinese Office Action for Application No. 201080030381.8 dated Apr. 8, 2015; 3 pages.
SIPO Chinese Office Action for Application No. 201080030381.8 dated Nov. 24, 2015; 2 pages.
Herbert Schwarz.,"Low-Power 16 MIPS Microcontroller With 4×4 mm2 Footprint" dated Feb. 8, 2006; DSP, Micros & Memory.
International Search Report for International Application No. PCT/US10/34185 dated Sep. 7, 2010; 2 pages.
Senthil Kumar Lakshmanan, "Towards Dynamically Reconfigurable Mixedsignal Electronics for Embedded and Intelligent Sensor Systems": http://deposit.d-nb.de/cgi-bin/dokserv?idn=991958470&dok_var=d1&dok_ext=pdf&filename=991958470.pdf.
SIPO Chinese Office Action for Application No. 201080030381.8 dated Oct. 20, 2014; 3 pages.
SIPO Chinese Office Action for Application No. 201080030381.8 dated Dec. 20, 2013; 6 pages.
USPTO Advisory Action for U.S. Appl. No. 12/773,801 dated Apr. 25, 2013; 2 pages.
USPTO Final Rejection for U.S. Appl. No. 12/773,801 dated Aug. 8, 2014; 14 pages.
USPTO Non Final Rejection for U.S. Appl. No. 13/893,201 dated Jan. 27, 2014; 9 pages.
USPTO Non-Final Rejection for U.S. Appl. No. 12/773,801 dated Jan. 31, 2014; 14 pages.
USPTO Notice of Allowance for U.S. Appl. No. 12/774,680 dated May 28, 2013; 8 pages.
USPTO Notice of Allowance for U.S. Appl. No. 13/893,201 dated Dec. 10, 2013; 10 pages.
USPTO Notice of Allowance for U.S. Appl. No. 13/916,386 dated Mar. 30, 2015; 8 pages.
USPTO Notice of Allowance for U.S. Appl. No. 13/916,386 dated Dec. 12, 2014; 9 pages.
Written Opinion of the International Searching Authority for International Application No. PCT/US10/34185 mailed Sep. 7, 2010; 5 pages.
Application No. PCT/US1034152 "Dynamically Reconfigurable Analog Routing Circuits and Methods for System on a Chip," Filed on May 8, 2010; 37 pages.
USPTO Non-Final Rejection for U.S. Appl. No. 14/540,238 dated Aug. 4, 2016; 11 pages.
USPTO Non-Final Rejection for U.S. Appl. No. 14/860,515 dated Jan. 21, 2016; 11 pages.
USPTO Non-Final Rejection for U.S. Appl. No. 14/860,515 dated Jun. 28, 2016; 10 pages.
USPTO Notice of Allowance for U.S. Appl. No. 13/893,201 dated May 21, 2014; 8 pages.
USPTO Notice of Allowance for U.S. Appl. No. 13/893,201 dated Jul. 14, 2014; 6 pages.
USPTO Notice of Allowance for U.S. Appl. No. 13/893,201 dated Sep. 3, 2014; 6 pages.
USPTO Notice of Allowance for U.S. Appl. No. 13/916,386 dated Jul. 17, 2015; 8 pages.
USPTO Requirement Restriction for U.S. Appl. No. 13/893,201 dated Oct. 22, 2013; 6 pages.

* cited by examiner

DYNAMICALLY RECONFIGURABLE ANALOG ROUTING CIRCUITS AND METHODS FOR SYSTEM ON A CHIP

This application claims the benefit of U.S. provisional patent application having Ser. No. 61/176,905 filed on May 9, 2009, the contents of which are incorporated by reference herein.

TECHNICAL FIELD

The present disclosure relates to integrated circuit devices, and more particularly to reconfigurable integrated circuit devices having digital and analog circuit blocks.

DETAILED DESCRIPTION

Figure 1:
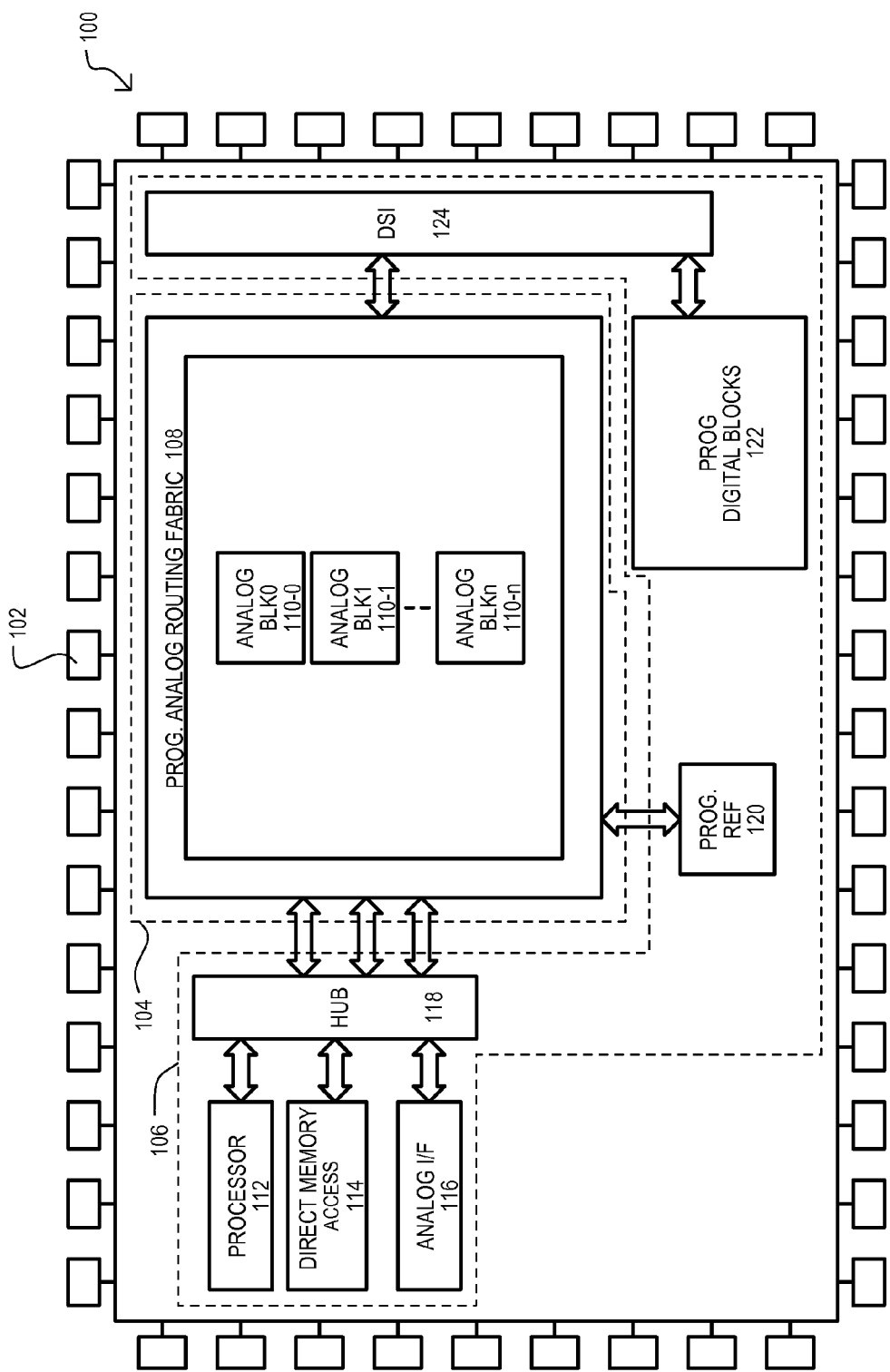
FIG. 1 shows an integrated circuit device according to an embodiment.

Various embodiments will now be described that show devices and methods of an integrated circuit device having a reconfigurable analog routing fabric for connecting input/outputs (I/Os) to one or more analog circuit blocks with multiple buses and connection circuits.

In the following description, like items are referred to by the same reference characters, but with the first digit(s) corresponding to the corresponding figure number.

Referring now to FIG. 1, an integrated circuit device according to a first embodiment is shown in a block diagram and designated by the general reference character 100. In some embodiments, a device 100 may be a "system-on-chip" that provides both programmable analog functions as well as programmable digital functions.

As shown in FIG. 1, a device 100 may include a number of external connection pins (one shown as 102), an analog section 104, and a digital section 106. Pins (e.g., 102) may provide a physical signal connection to device 100, and may be input pins, output pins, or pins serving as both an input and an output. Such pins (e.g., 102) will be referred to herein as input/output (I/O) pins, it being understood such pins serve as (or may be configured to serve as) an input, output or both. In some embodiments, pins (e.g., 102) may be configured as either analog pins (i.e., input or output analog signals) or digital pins (i.e., input or output binary logic signals). Further, in some embodiments, pins (e.g., 102) may be dedicated pins (e.g., only digital input and/or output pins).

An analog section 104 may include a programmable analog routing fabric 108 and a number of analog blocks 110-0 to -n.

Analog routing fabric 108 may be configured (and reconfigured) to provide signal paths between I/O pins (e.g., 102) configured as analog I/Os and any of analog blocks (110-0 to -n). As but a few examples, an analog routing fabric 108 may provide pin-to-pin paths via one or several buses, enable several pins to be connected to a single bus, enable several buses to be connected to a single pin, and/or enable any analog I/O pin to be connected to any analog block (110-0 to -n).

An analog routing fabric 108 may be programmed (and reprogrammed) according to analog routing data. As will be described below, in contrast to conventional approaches, such analog routing data may be provided from any of a number of different sources, rather than only from an on-board processor. In a particular embodiment, an analog routing fabric 108 may include multiple buses that may be connected to one another by connection circuits based on analog routing data.

Analog blocks (110-0 to -n) may include analog circuits that execute analog circuit functions. Analog blocks (110-0 to -n) may be connected to I/O pins (e.g., 102) and/or to one another by analog routing fabric 108. Selected or all of analog blocks (110-0 to -n) may also receive and/or output digital data to digital section 106. Analog blocks (110-0 to -n) may include various analog circuits, including but not limited to capacitance sense circuits, comparators, analog-to-digital-converters (ADCs) (including "sigma-delta" types and/or successive approximation types), filters (including low pass filters), switched capacitor type circuits, and/or digital-to-analog converters (DACs) (including both current and/or voltage DACs).

It is understood that all or a portion of analog routing fabric 108 may be configured dynamically (changed during the operation of a device 100) or statically (maintained substantially the same throughout the operation of device 100).

In the embodiment shown, a digital section 106 may include a processor section 112, a direct memory access (DMA) circuit 114, an analog interface I/F circuit 116, a data transfer hub circuit 118, a programmable reference generator 120, programmable digital section 122, and a digital system interconnect (DSI) 124. A processor section 112 may include one or more processors that may execute predetermined instructions. A processor section 112 may one source for providing analog routing data for configuring analog routing fabric 108.

A DMA circuit 114 may enable transfers of data between device 100 and other devices without direct control of processor section 112. A DMA 114 may also be a source of analog routing data for configuring analog routing fabric 108. This is in sharp contrast to conventional approaches that limit programmability of a routing fabric to data issued from a processor, or the like. While the embodiment of FIG. 1 shows a DMA circuit 114, other embodiments may include different types of data transfer circuits that may serve as a source of analog routing data independent of a processor section 112.

An analog I/F circuit 116 may receive analog signals, and convert them to a digital domain. An analog I/F circuit 116 may be a further source of analog routing data for configuring analog routing fabric 108.

A data transfer hub circuit 118 may provide a data transfer path between a processor section 112 and devices external to device 100, as well as locations within device 100. As but a few of the many possible examples, a data transfer hub 118 may enable data transfers to one or more interfaces for communicating with external devices, including one or more external memory interfaces, one or more serial data transfer interfaces, and/or one or more I/Os (e.g., 102). Data transfer hub 118 may also transfer data between on board (i.e., circuits of the same device) sections, including internal memory circuits, interrupt control circuits, power management circuits, timing circuits, analog interface circuit 116, programmable digital section 122 and/or DSI 124.

A programmable reference generator 120 may generate reference currents and/or voltages that may be used in analog section 104. Such programmed currents/voltages may also be provided as output values from device 100.

A programmable digital section 120 may provide programmable logic circuits that may be configured into various digital functions based on digital configuration data. In very particular embodiments, a programmable digital section 120 may include programmable logic device blocks with programmable functions, and programmable interconnections. Programmable digital section 120 may be yet another source of analog routing data for configuring analog routing fabric 108.

A DSI 124 may enable interconnections between various parts of the digital section 106, and in addition may provide digital connections to analog section 104. More particularly, DSI 124 may provide analog routing data, or signals generated from such routing data, to dynamically configure analog routing fabric 108. In very particular embodiments, a DSI 124 may enable analog routing fabric 108 to be configured from any of: processor section 112, direct access circuit 114, analog I/F circuit 116 and/or programmable digital section 122. Though not shown in FIG. 1, a DSI 124 may also provide connections to fixed digital function blocks.

In this way, an integrated circuit may include analog circuit blocks connected to I/O pins with an analog routing fabric reconfigurable according to analog routing data from various sources in addition to a processor.

Figure 2:
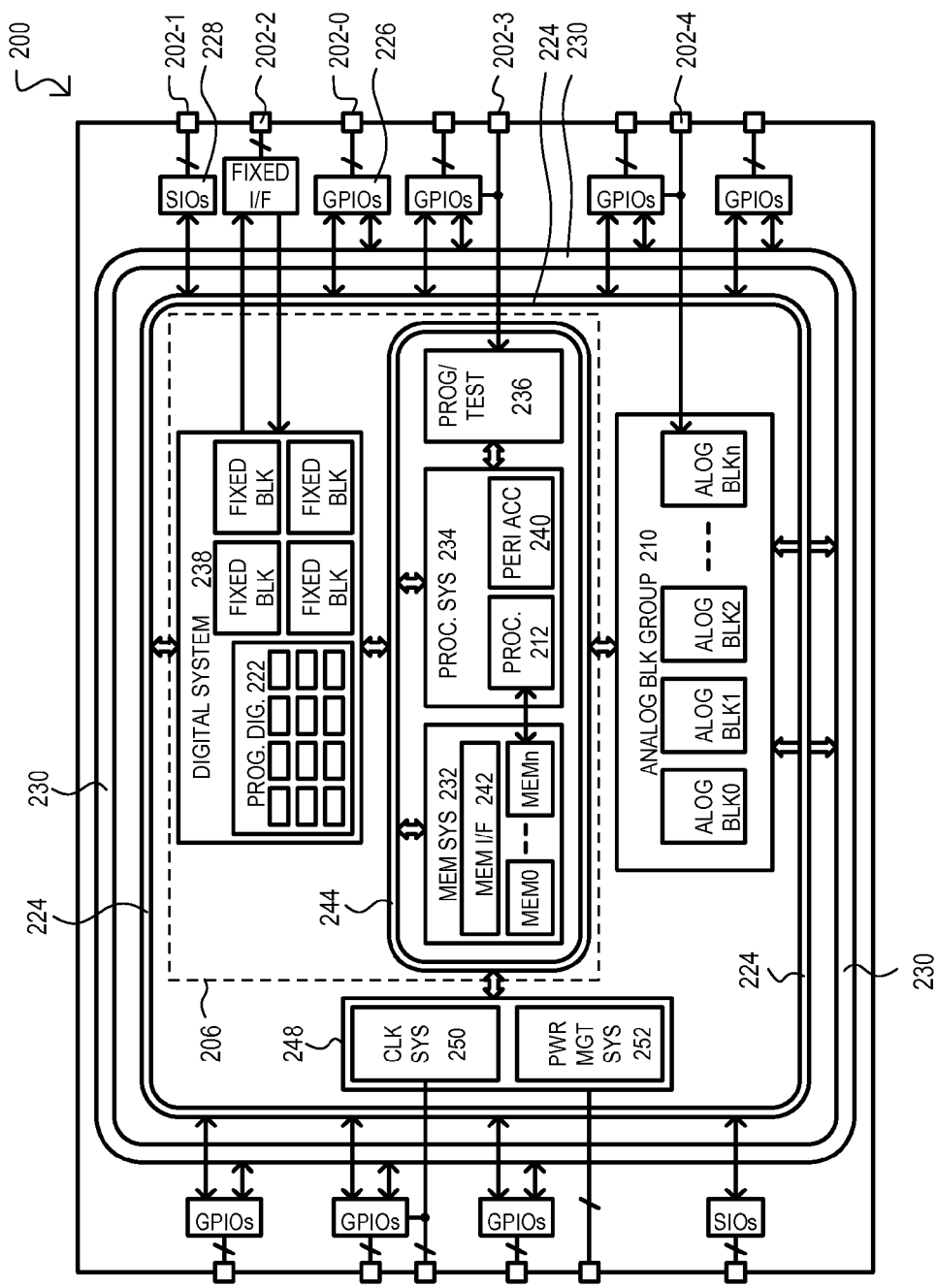
FIG. 2 shows an integrated circuit device according to another embodiment.

Referring now to FIG. 2, an integrated circuit device according to a further embodiment is shown in a block diagram and designated by the general reference character 200. The device of FIG. 2 may be one implementation of that shown in FIG. 1.

In the embodiment of FIG. 2, pins may include general purpose I/O (GPIO) pins (one set shown as 202-0), special I/O pins (SIO) (one set shown as 202-1), and direct connection pins (three sets shown as 202-2/3/4).

GPIO pins 202-0 may be connected to corresponding GPIO configuration circuits (one shown as 226). GPIO configuration circuits (e.g., 226) may enable a GPIO pin to be connected to an analog interconnect 230 and/or a DSI 224. Accordingly, when connected to analog interconnect 230, a GPIO pin (e.g., 202-0) may serve as an analog input and/or output. Conversely, when connected to DSI 224, a GPIO pin (e.g., 202-0) may serve as a digital input and/or output. A GPIO configuration circuit (e.g., 226) may also provide different types of connections to analog interconnect 230. In particular, a GPIO pin may be connected one or more different buses of an analog interconnect 230.

SIO pins (e.g., 202-1) may be connected to SIO configuration circuits (e.g., 226). SIO configuration circuits (e.g., 228) may enable an SIO pin to be connected to DSI 224. Accordingly, SIO pins (e.g., 202-1) may be programmable as a digital input and/or output. However, such pins (e.g., 202-1) may not serve as an analog I/O.

Direct connection pins (e.g., 202-2/3/4) may have a direct connection to particular circuit sections of device 200. Set 202-2 may only provide connections to one particular interface circuit. In contrast, set 202-3 may provide a direct connection to a digital circuit, as well as a GPIO configuration circuit (e.g., 226), while set 202-4 may provide a direct connection to an analog circuit block, as well as a GPIO configuration circuit (e.g., 226).

Referring still to FIG. 2, an analog block group 210 in combination with GPIO configuration circuits (e.g., 226) and analog interconnect 230 may form an analog routing fabric. Analog block groups 210 may include a number of analog blocks (ALOG BLK0 to n) which may be connected to GPIOs through analog interconnect 230 and GPIO configuration circuits (e.g., 226), and to one another through analog interconnect 230. Analog blocks (ALOG BLK0 to n) may take the form of those shown as 110-0 to -n, or equivalents.

Analog interconnect 230 may include a number of buses and connection circuits to enable reconfigurable interconnection between GPIO configuration circuits (e.g., 226) and analog block group 210. In a particular embodiment, analog interconnect 230 may include: global buses that may enable signal paths to be created between GPIOs and any or all of analog blocks (ALOG BLK0 to n), local buses that may enable signal paths to be created between any or all of analog blocks (ALOG BLK0 to n), and multiplexer buses that may enable one bus to connect multiple GPIOs to any or all of analog blocks (ALOG BLK0 to n).

In FIG. 2, a digital section 206 may include a memory system 232, a processor system 234, a program and test system 236, and a digital system 238.

A memory system 232 may include a memory I/F 242 and one or more memories (MEM0 to -i). A memory I/F 242 may enable external access to memory devices by device 100. Memories (MEM0 to -i) may include various types of memories, including but not limited to a static random access memory (SRAM), nonvolatile memory (including EEPROMs, and flash EEPROM). Such memories (MEM0 to -i) may be directly accessible by processor system 234.

A processor system 234 may include a processor 212 as well as peripheral access system 240. A processor 212 may include one or more processors as well as corresponding circuits such as memory controller (including cache controllers) and an interrupt control circuit. A peripheral access system 240 may include circuits such as a direct access circuit, like that shown as 114 in FIG. 1 and/or a data transfer hub circuit, like that shown as 118, or equivalents.

A program and test system 236 may include circuits that enable data to be loaded into memory system 232 (program data for execution by processor system 234), as well as test circuits for providing test data to and test result data from a device 200.

Memory system 232 and processor system 234 may be connected to a system bus 244. A system bus 244 may also be connected to analog block group 210.

A digital system 238 may include programmable digital section 222 as well as a number of fixed function digital blocks (FIXED BLK0 to -j). Programmable digital section 222 may be like that shown as 122 in FIG. 1, or an equivalent. Fixed function digital blocks (FIXED BLK0 to -j) may provide predetermined digital functions for device. Fixed function digital blocks (FIXED BLK0 to -j) may include any suitable digital circuit, including but not limited to timer circuits, counter circuits, digital modulation circuits, serial interface circuits, and/or network interface circuits. In the particular embodiment shown, digital system 238 may be connected to a fixed interface circuit 246, which may be a physical layer (PHY) interface circuit.

A DSI 224 may provide digital connection between various sections of the digital system 238 and/or connections to suitably configured GPIO pins (e.g., 202-0) or SIO pins (e.g., 202-1).

In the particular embodiment shown, a device may also include system resources 248. System resources 248 may include a clock system 250 and a power management system 250. A clock system 250 may provide timing signals to various portions or a device 200 based one or more clock generation circuits and/or one or more received timing signals. A power management system 250 may provide power supply voltages and regulation to various portions of device 200. A power management 250 may selectively disable portions of the device for low power (i.e., sleep) modes of operation.

In this way, an integrated circuit may include I/Os programmable to connect to one or more buses of an analog interconnect to enable connections between I/Os and/or to analog blocks.

Figure 3:
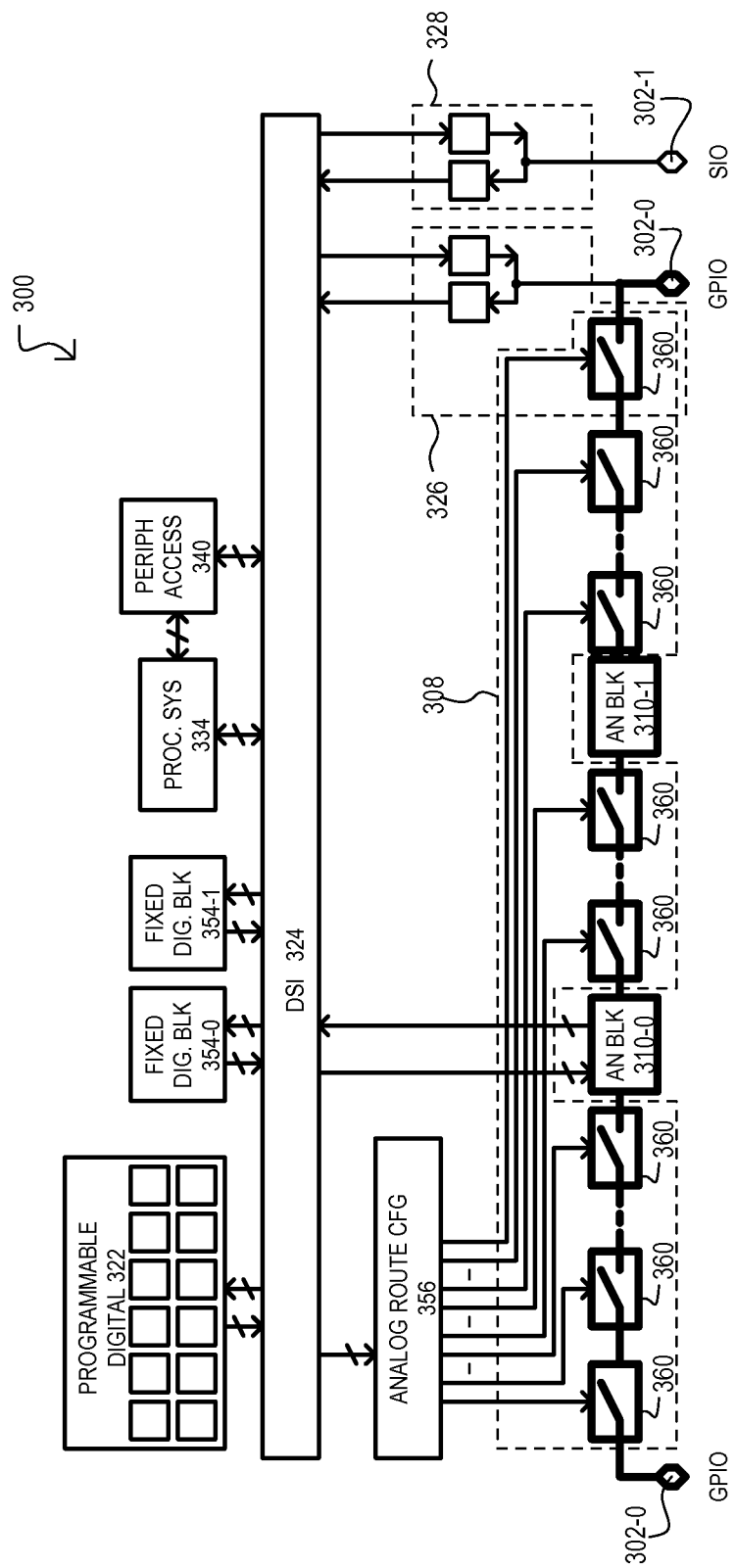
FIG. 3 is a representation of an integrated circuit device architecture according to an embodiment.

Referring now to FIG. 3, an integrated circuit device configuration architecture according to an embodiment is shown in a block schematic diagram and designated by the general reference character 300.

Architecture 300 shows programmable digital section 322, fixed function digital blocks 354-0/1, processor system 334 and peripheral access system 340 connected to a DSI 324. A DSI 324 may provide digital signal paths between various circuits connected to it. In one very particular embodiment, such a connection may be configurable through programmable digital section 322.

DSI 324 may also be connected to analog route configuration circuit 356. Analog route configuration circuit 356 may provide configuration values to analog routing fabric 308 to enable reconfigurable connections between GPIOs 302-0 and analog blocks 310-0/1. In one embodiment, analog route configuration circuit 356 may be accessible via any of the other circuit blocks connected to DSI 324, enabling analog routing configuration via multiple sources. In a very particular embodiment, analog route configuration circuit 356 may include, or be the output of, configuration registers that may be written to contain analog routing data. Such analog routing data may be updated to dynamically change an analog routing configuration.

In the particular embodiment of FIG. 3, analog routing fabric 308 is represented by various connection elements 360 controlled by analog route configuration circuit 356. Connection elements 360 may provide connections between buses (not shown), GPIOs 302-0, and analog blocks 310-0/1. In particular embodiments, connection circuit elements 360 may be controlled in groups as connection circuits. Such connection circuits may have a switch configuration, allowing any number of connection elements of a group to be enabled in response to analog routing data. Alternatively, connection circuits may have a multiplexer (MUX) configuration, allowing only one connection element to be enabled in the group at one time. It is understood that FIG. 3 shows but two analog blocks 310-0/1 and two GPIOs 302-0 for illustration purposes. A device 300 may include additional blocks and connections as shown in the other embodiments described herein, and equivalents.

FIG. 3 also shows a GPIO a configuration circuit 326 and SIO configuration circuit 328. A GPIO configuration circuit 326 may provide a digital input and/or output path to DSI 324, as well as one or more connections (only one shown) as part of the analog routing fabric 308. In contrast, SIO configuration circuit 328 may provide only a digital connection to DSI 324.

In this way, an integrated circuit device may include an analog routing fabric controlled by an analog route configuration circuit connected to any one of a number of digital blocks by a configurable digital system interconnect.

Figure 4:
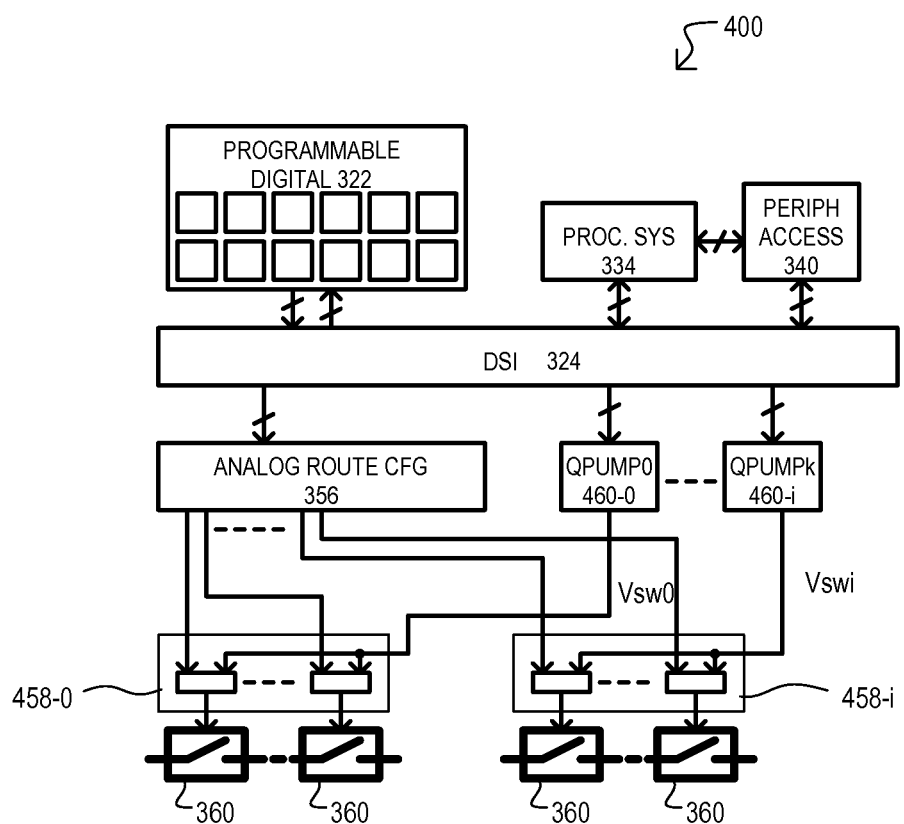
FIG. 4 is a representation of an integrated circuit device architecture according to another embodiment.

Referring now to FIG. 4, an integrated circuit device configuration architecture according to a further embodiment is shown in a block schematic diagram and designated by the general reference character 400. FIG. 4 includes many of the same items as FIG. 3, thus a description of such items will be omitted.

FIG. 4 differs from FIG. 3 in that switch voltage generator circuits 460-0 to -i may be included the generate switch voltages Vsw0 to Vswi that may be outside of a power supply voltage received by an integrated circuit 400. For example, a switch voltage (Vsw0 and/or Vswi) may be higher than a high power supply voltage or lower than a low power supply voltage. Switch voltage generator circuits (460-0 to -i) may receive configuration values from DSI 324. Consequently, switch voltage generator circuits (460-0 to -i) may be configured (and reconfigured) in substantially the same manner as analog routing fabric 308 (e.g., multiple sources). In one particular embodiment, voltage generator circuits 460-0 to -i may be charge pump circuits.

In the embodiment shown, a switch voltage (Vsw0 and/or Vswi) may be applied to connection elements 360 by switch activation circuits 458-0/1 according to configuration values received from analog route configuration circuit 356.

In this way, an integrated circuit device may include a programmable analog routing fabric having connection elements operated by voltages levels outside the range of received power supply voltages.

As noted above, in some embodiments, I/O pins may be selectively connected to one or more buses of an analog routing fabric to enable analog signal paths between such I/O pins and one or more analog blocks. Particular I/O connection circuits according to one embodiment will now be described with reference to FIG. 5.

Figure 5:
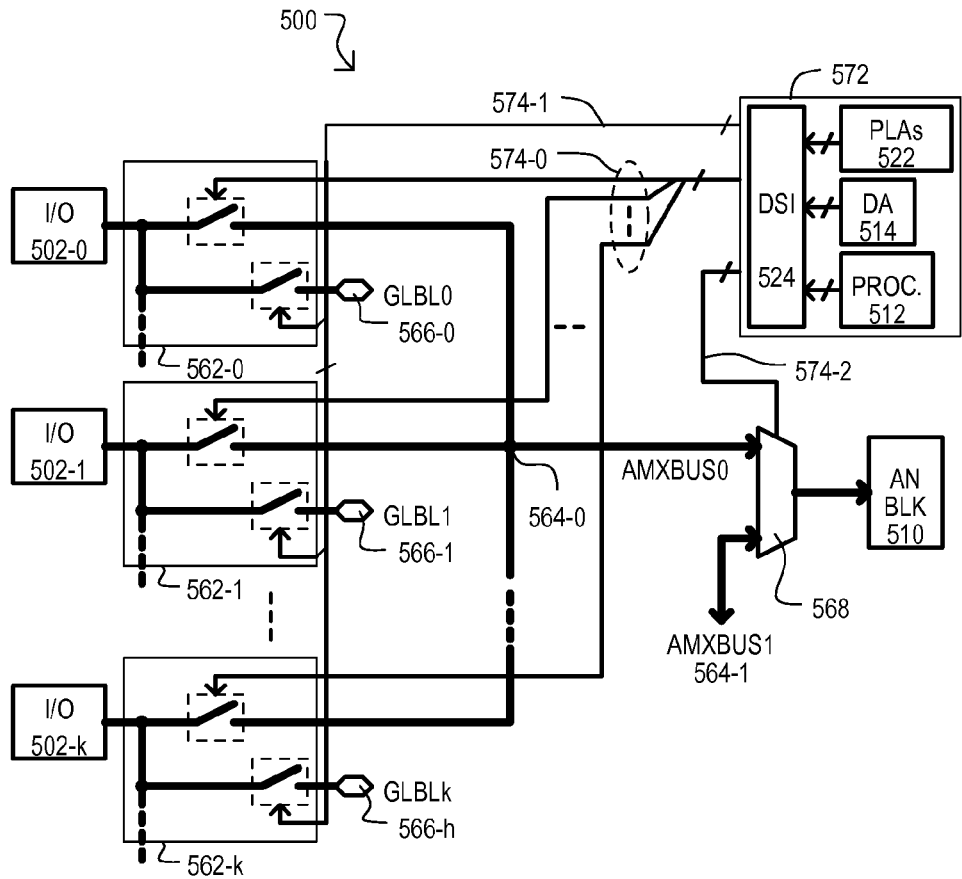
FIG. 5 shows input/output (I/O) connection circuits according to an embodiment.

Referring to FIG. 5, I/O connection circuits according to an embodiment are shown in a block schematic diagram and designated by the general reference character 500. I/O connection circuits 500 may form part of a programmable analog routing fabric of embodiments shown herein.

I/O connection circuits 500 may include a number of I/O pins 502-0 to -k, I/O connection circuits 562-0 to -k, analog MUX buses (AMXBUS0/1) 564-0/1, a number of global buses 566-0 to -h, an analog block connection circuit 568, an analog block 510, and an analog routing signal source 572.

I/O connection circuits (562-0 to -k) may receive first analog routing data 574-0 and second routing data 574-1, and in response, connect a corresponding I/O pin (502-0 to -k) to AMXBUS0 564-0 and/or a corresponding global bus (566-0 to-h). I/O connection circuits (562-0 to -k) may operate in a switch or MUX like fashion as noted above. It is understood that each I/O connection circuit (562-0 to -k) may connect its corresponding I/O pin (502-0 to -k) to other global buses not shown.

Referring still to FIG. 5, an analog block connection circuit 568 may connect any of AMXBUS0/1 564-0/1 to analog block 510 based on third analog routing data 574-2.

A routing value source 572 may provide routing data to dynamically reconfigure connections between I/Os and buses. In the particular embodiment of FIG. 5, a routing value source 572 may include any of: a programmable digital section 522, a direct access circuit 514, or a processor section 512 that provide routing data by way of a DSI 524. It is understood that routing data 574-0/1/2 may be dynamic, changing over time according to operations of a device.

In this way, any of multiple I/O pins may be selectively connected to global buses and/or an analog MUX bus, where the analog MUX bus provides a path to one or more analog blocks.

Figure 6:
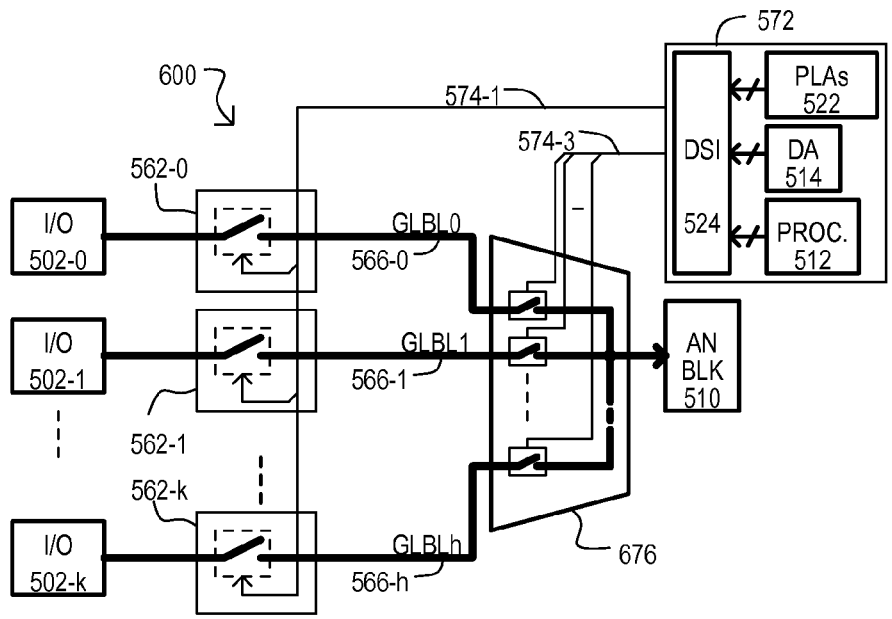
FIG. 6 shows I/O connection circuits according to a further embodiment.

Referring to FIG. 6, I/O connection circuits according to another embodiment are shown in a block schematic diagram and designated by the general reference character 600. I/O connection circuits 600 may form part of a programmable analog routing fabric of embodiments shown herein, and may be used in combination with those shown in FIG. 5. FIG. 6 includes many of the same items as FIG. 5, thus a description of such items will be omitted.

FIG. 6 may differ from FIG. 5 in that a global bus connection circuit 676 may connect any of global buses (566-0 to -h) to analog block 510 based on fourth analog routing data 574-2.

In this way, I/O pins may be connected to global buses, any of which may be selectively connected to one or more analog blocks.

As noted in embodiments above, a GPIO pin may serve as an analog I/O or a digital I/O. One very particular GPIO configuration circuit such a function is shown in FIG. 7.

Figure 7:
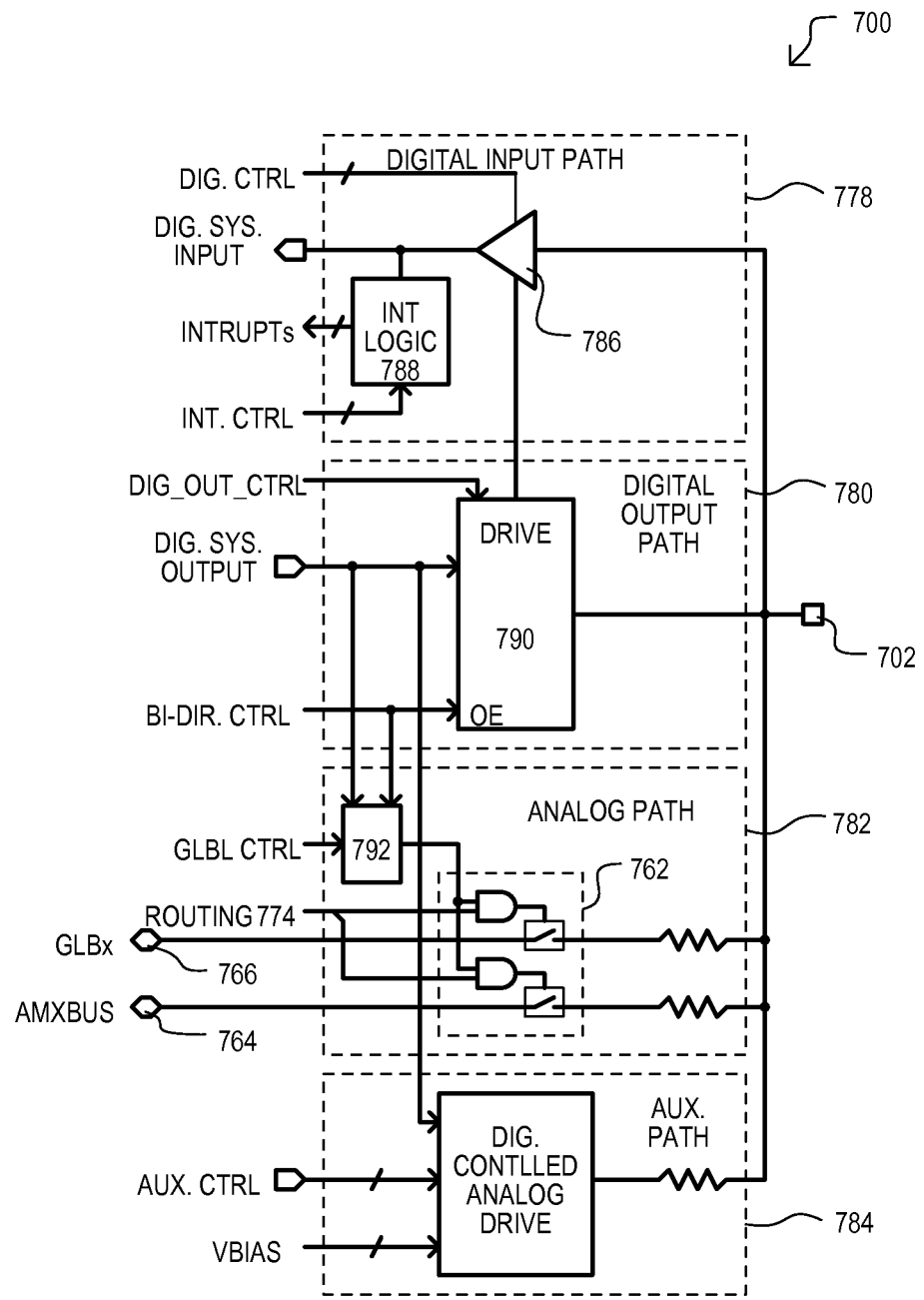
FIG. 7 shows a general purpose I/O configuration circuit according to one embodiment.

Referring to FIG. 7, a GPIO configuration circuit according to one embodiment is shown in a block schematic diagram, and designated by the general reference character 700. A GPIO configuration circuit 700 may be one example of that shown as 226 in FIG. 2.

A GPIO configuration circuit 700 may include a digital input path 778, a digital output path 780, an analog path 782, and an auxiliary function path 784. A digital path 778 may include an input driver 786 having an input coupled to GPIO pin 702 and an output that provides a digital system input signal. In one embodiment, such a digital input signal may be provided to a DSI (not shown). Input driver 786 may be controlled by digital control signals (DIG. CTRL). An output of input driver 786 may also be connected to interrupt logic 788 which may generate interrupts (INTRUPTs) for other circuits of the device.

A digital output path 780 may include an output driver 790 having an input that receives a digital system output signal. Such a digital output signal may be provided from a DSI. Output driver 790 may drive GPIO pin 702 in response to such a digital output signal. An output driver 790 may control a drive strength and/or slew of an output signal in response to digital output control signal (DIG_OUT_CTRL). In response to a bi-directional control signal (BI-DIR CTRL), digital output path 780 may be disabled (and digital input path 778 enabled).

An analog path 782 may include an I/O connection circuit 762 that may selectively connect GPIO pin 702 to a global bus 766 and/or an analog MUX bus 764 in response to routing data 774 and output data from global control logic 792. Global and analog MUX buses may take the form of any of those shown in other embodiments herein, and equivalents.

In the very particular embodiment shown, an auxiliary function path 784 may drive a GPIO 702 with a generated bias voltage VBIAS based on a digital output signal. In a very particular embodiment, an auxiliary function path 784 may be a liquid crystal display (LCD) bus, for driving LCD elements.

Figure 8:
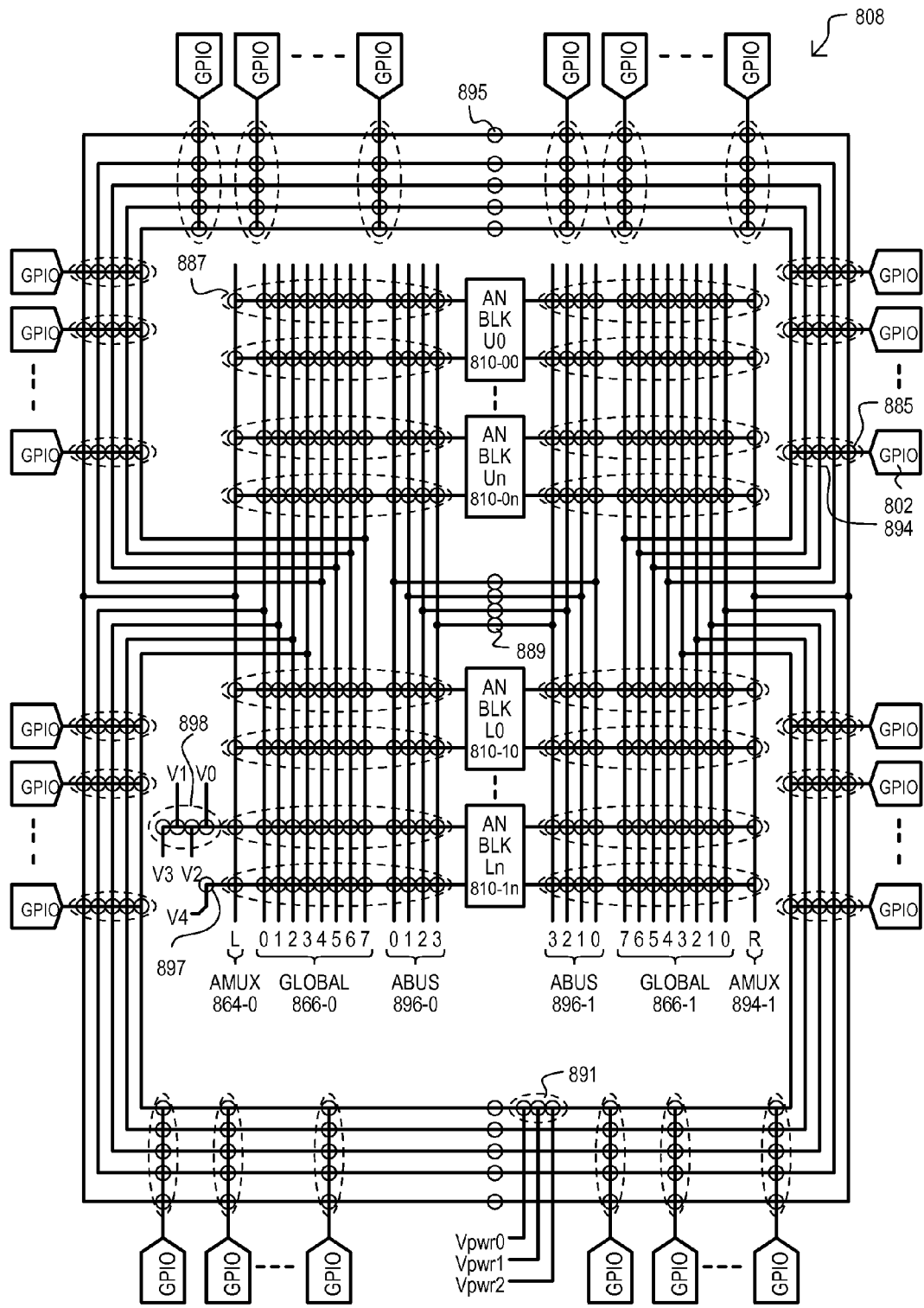
FIG. 8 shows a programmable analog routing fabric according to an embodiment.

Having described various embodiments with programmable analog routing fabrics, an analog routing fabric according to one very particular embodiment is shown in a block schematic diagram in FIG. 8, and designated by the general reference character 808.

FIG. 8 shows a routing fabric 808 that may connect GPIO pins (one shown as 802) to any of analog blocks (810-00 to 810-1n) by way of analog MUX (AMUX) buses 864-0/1, global buses 866-0/1 and/or local buses 896-0/1. Routing fabric 808 may be conceptualized as having a left and right side, with a left side including one left AMUX bus 864-0, eight left global buses (0-7) 866-0, and four left local buses (896-0). A right side may include one right AMUX bus 864-1, eight right global buses (0-7) 866-1, and four right local buses (896-1).

Programmable connections between the various buses, GPIO pins, and analog blocks are shown by circles (one shown as 885). Each programmable connection may be dynamically enabled or disabled in response to analog routing data to configure a routing fabric for desired analog functions. In some embodiments, programmable connections may vary in impedance, with some having a lower on impedance than others. In particular, connections to impedance sensitive analog blocks may have a lower impedance value than other connections.

Connections surrounded by dashed lines may denote a connection group. A connection group may operate in a switch mode (any of the connections can be enabled) and/or MUX mode (only one connection enabled), as noted above. Connection groups may take various forms including but not limited to: I/O connection groups (one shown as 894) that may connect a corresponding GPIO pin to global buses and/or an AMUX bus; reference connection groups (one shown as 898), that may connect reference voltages and currents to one or more buses or analog blocks, power supply connection groups (one shown as 891) that may connect power supply voltages to one or more buses; block connection groups (one shown as 887) that may connect an analog block to any of multiple buses. It is noted that the embodiment of FIG. 8 shows connection blocks with connections to substantially all available buses. As will be shown below, in particular embodiments, connection may be provided to only selected buses.

Programmable connections may also include any of: individual reference connections (one shown as 897) that may provide a single reference voltage (or current) to a bus or analog block; AMUX joining connections (one shown as 895) that may connect one AMUX bus to another; global joining connections (one shown as 893) that may connect a left hand side global bus to a corresponding right hand side global bus; and local joining connections (one shown as 889) that may a left hand side local bus to a corresponding right hand side local bus.

Referring still to FIG. 8, AMUX buses 864-0/1 may enable any of GPIO pins (e.g., 802) to be connected to any of analog blocks (810-00 to -1n). Global buses 866-0/1 may connect selected GPIOs to analog blocks (810-00 to -1n). Local buses 896-0/1 may enable analog blocks (810-00 to -1n) to be connected to one another.

In some embodiments, selected or all buses 864-0/1, 866-0/1, 896-0/1 may be shielded, to limit signal coupling between buses (and other signal lines). Shielding may include forming a shielding conductor adjacent to such bus lines, a maintaining the shielding conductor at a potential that limits signal coupling, or any other suitable shielding techniques. In a very particular embodiment, local buses 896-0/1 and global buses 866-0/1 may be shielded.

In this way, an analog routing fabric may include: analog MUX buses that may dynamically connect multiple GPIOs to one or more analog blocks, unified global buses that may connect selected GPIOs to analog blocks, and local buses that may connect analog blocks to one another.

Having described embodiments with analog blocks connected to buses of a switching fabric, very particular examples of analog block connections will now be described.

Figure 9A:
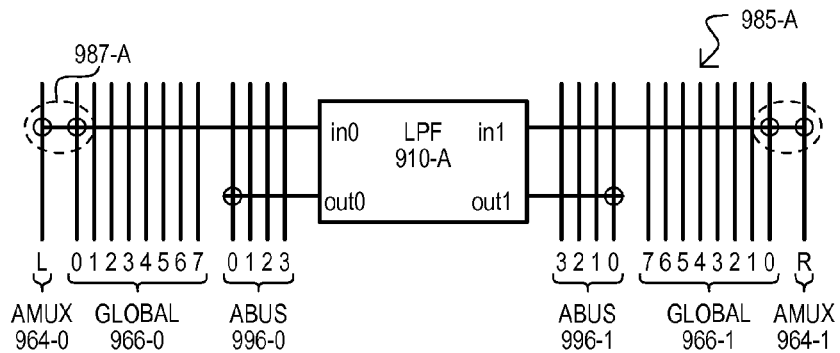
FIGS. 9A to 9H show various analog block connection arrangements according to particular embodiments.

Referring to FIG. 9A, an example of an analog block connection is shown in a block schematic diagram and designated by the general reference character 985-A. An analog block 910-A may be a filter block having two filters, one filter may have an input (in0) connectable to a left AMUX bus 964-0 and/or left global bus 0 by a connection group 987-A. A corresponding output (out0) may be connected to a local bus 0. A second filter may have similar connections to corresponding right hand side buses.

Figure 9B:
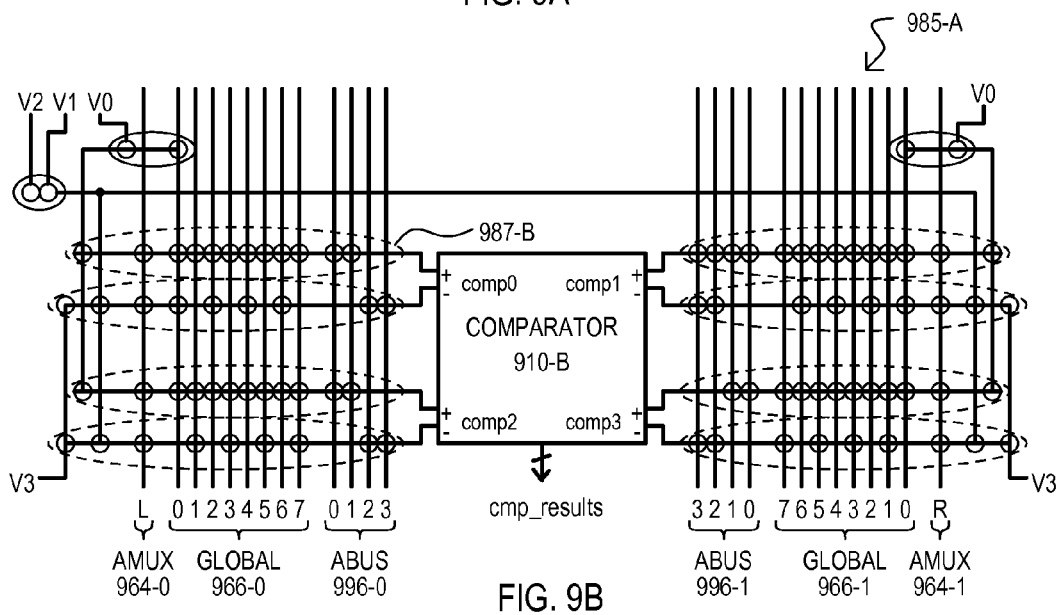

Referring to FIG. 9B, another example of an analog block connection is shown in a block schematic diagram and designated by the general reference character 985-B. An analog block 910-B may be a comparator block having four comparators, each having a "+" input and a "−" input. Such inputs may be connected to selected buses and/or reference voltages by connection groups (one shown as 987-B). In the embodiment shown, comparator block 910-B may provide comparator results (cmp_results) as digital data. In a particular embodiment, a digital data may be provided to a DSI (not shown).

Figure 9C:
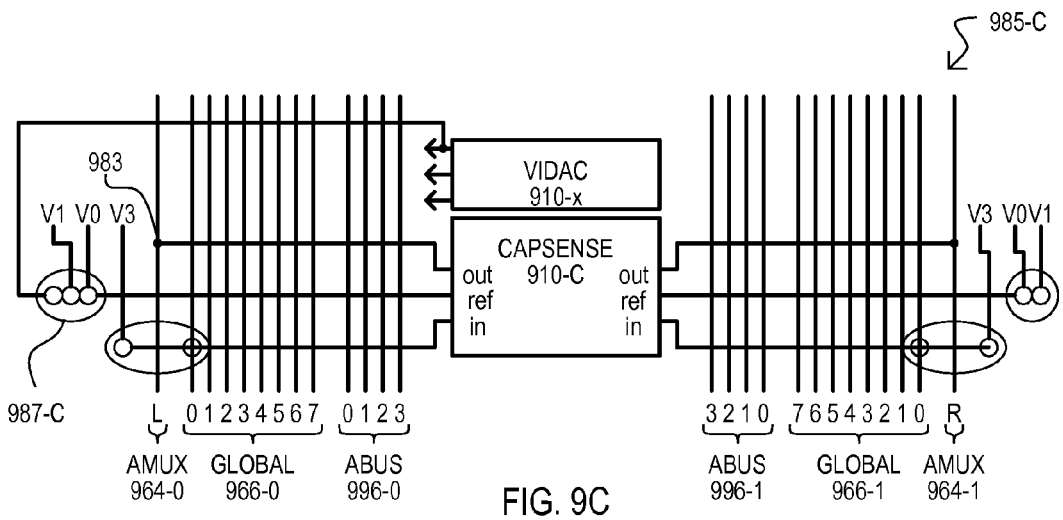

Referring to FIG. 9C, another example of an analog block connection is shown in a block schematic diagram and designated by the general reference character 985-C. An analog block 910-C may be a capacitance sense block having two sense circuits, each having an output (out), an reference input (ref), and a signal input (in). In the embodiment shown, outputs (out) may have a "hard" (i.e., nonprogrammable) connection 985 to AMUX buses 964-0/1. In addition, another analog block (in this example a DAC block 910-x), may selectively provide a reference value to a reference input through connection group 987-C.

Figure 9D:
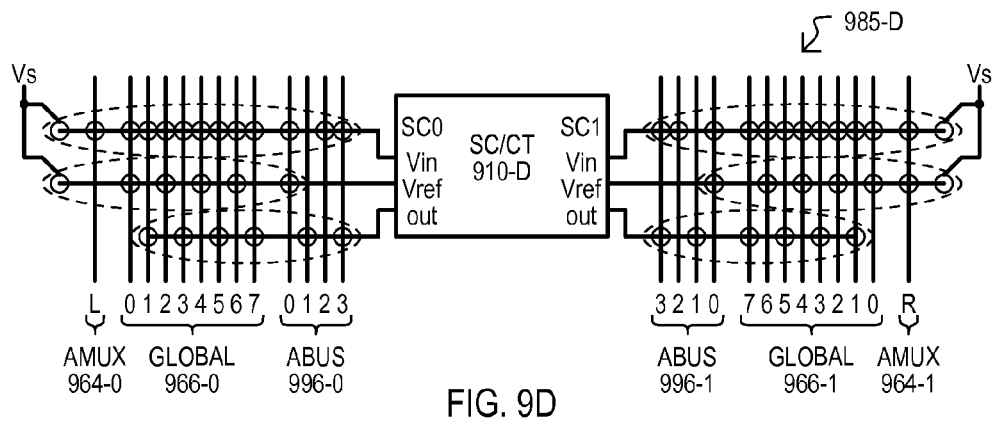

FIG. 9D shows an analog block connection for a switched capacitor/continuous time analog circuit block 985-D. Connections are understood from the above descriptions.

Figure 9E:
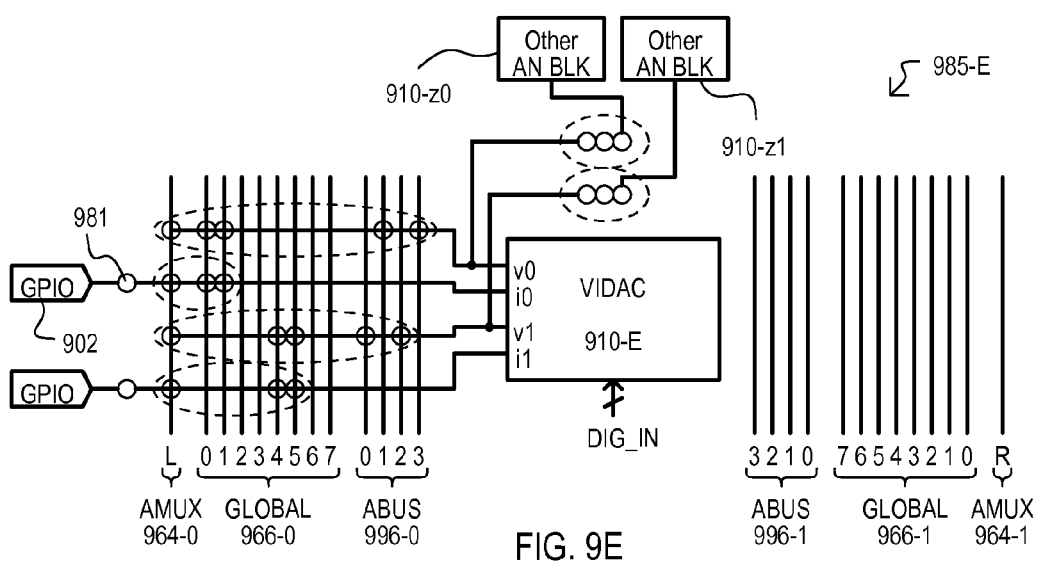

FIG. 9E shows an analog block connection for a voltage or current DAC (VIDAC) block 985-E. VIDAC block 985-E shows an arrangement in which outputs (v0, v1) from the analog block 910-E may be provided as inputs to other analog blocks (910-z0/1). A VIDAC block 985-E may receive input digital values (DIG_IN) for conversion. In particular embodiments, such digital values may be received from a DSI. FIG. 9E also shows an arrangement in which GPIOs (one shown as 902) may be connected to an analog block 910-E by an I/O connection 981, rather than by buses. Further in the embodiment shown, VIDAC 985-E may only have connections to left side buses.

Figure 9F:
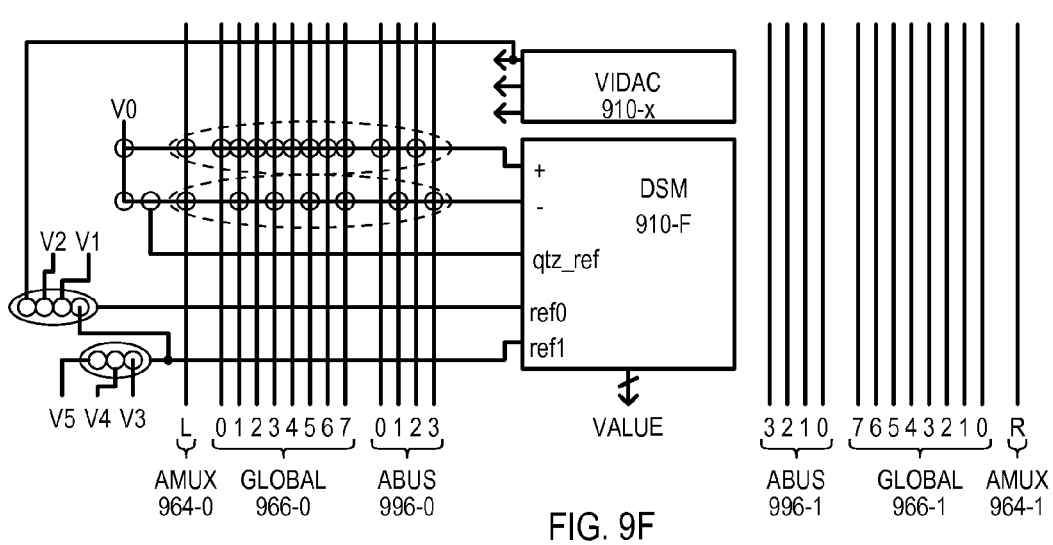

FIG. 9F shows an analog block connection for a delta-signal modulation ADC (DSM) block 985-F. Connections are understood from the above descriptions. A DSM block 985-F may output digital data (VALUE) reflecting conversion results. In a particular embodiment, a digital conversion results may be provided to a DSI (not shown).

Figure 9G:
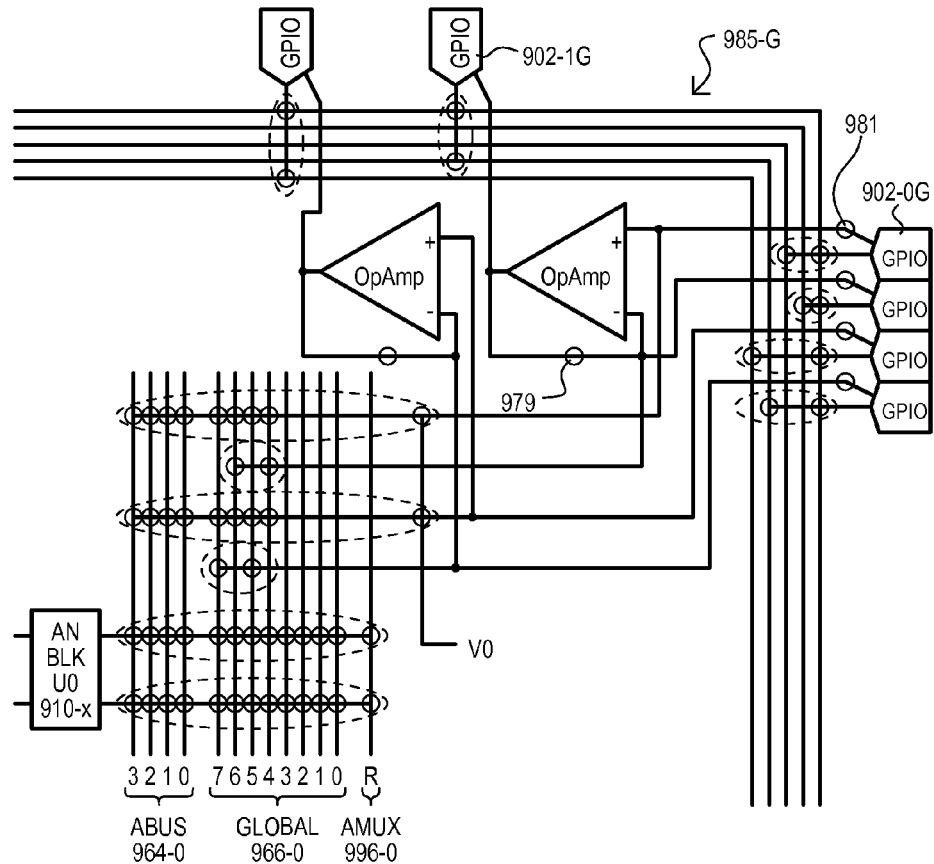

FIG. 9G shows an analog block connection for an operational amplifier (op amp) block 985-G. Connections are understood from the above descriptions. FIG. 9G shows an arrangement in which analog block 985-G may have inputs (+, −) connected to lines of local buses 964-0, lines of global buses 966-0, or a reference value (V0). However, in addition, such inputs may also be connected to GPIO pins (one shown as 902-0G) by I/O connection (one shown as 981). Further, a negative feedback path between an (−) input and an output of each op amp may be enabled by a circuit connection (one shown as 979). Still further, op amp outputs may also have a direct connection to certain GPIO pins (one shown as 902-1G).

Figure 9H:
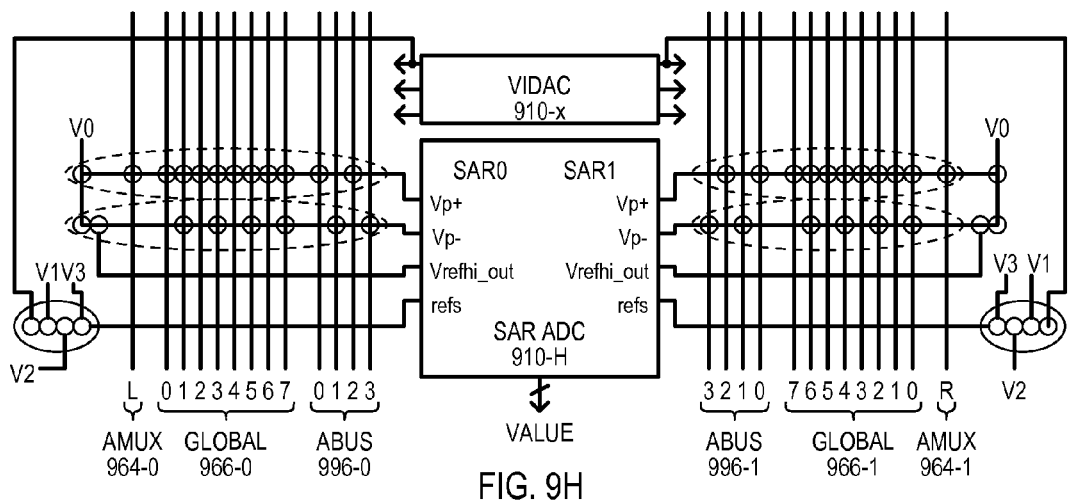

FIG. 9H shows an analog block connection for a successive approximation (SAR) ADC block 985-H. Connections and digital output values are understood from the above descriptions.

Having described programmable analog routing fabrics and analog block connections to such fabrics, methods of providing connection paths according to very particular embodiments will now be described. In the below figures, solid circles designate enabled connections to buses.

Figure 10A:
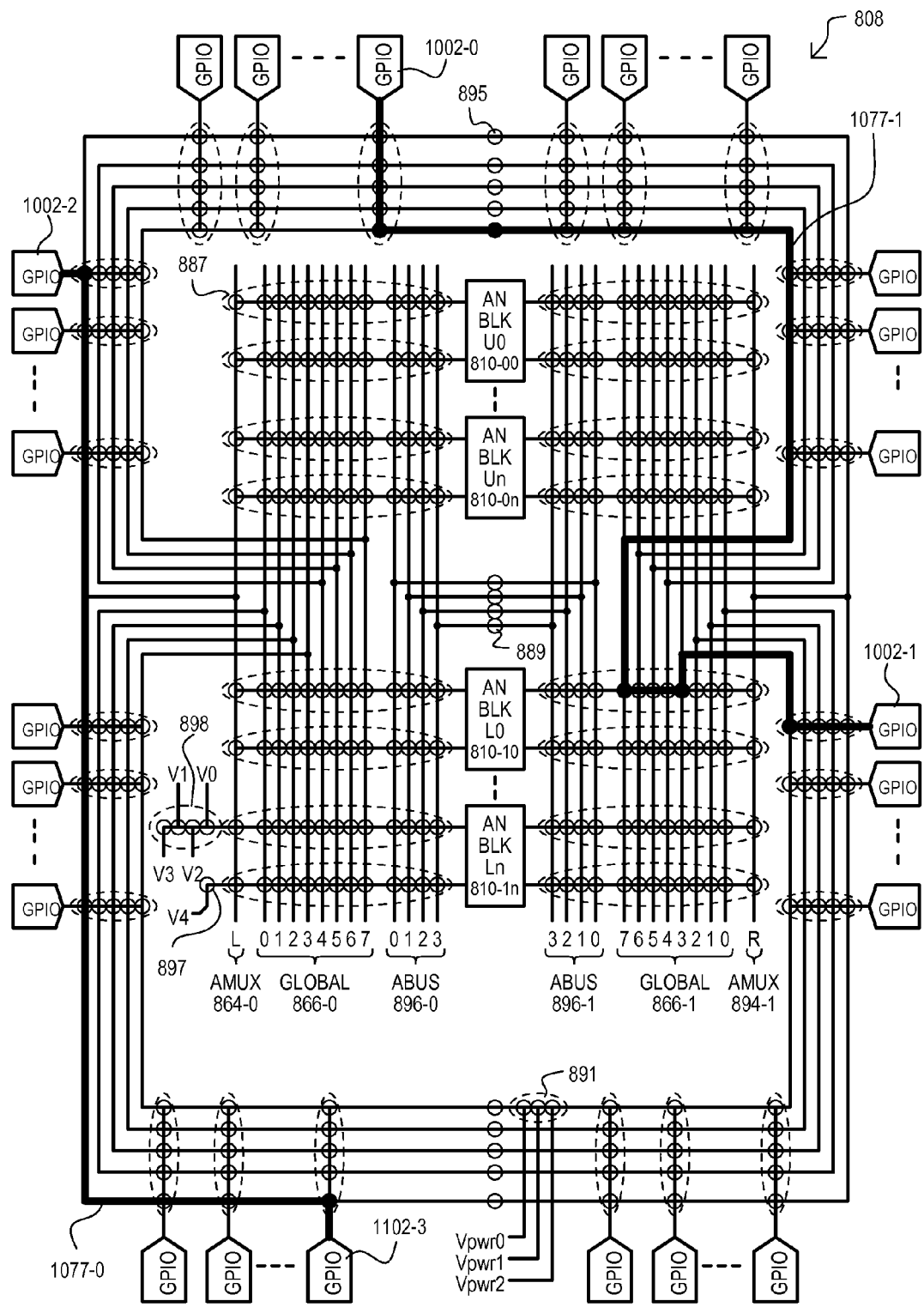
FIGS. 10A to 10D show various signal path connections that may be created with an analog routing fabric according to various embodiments.

Referring to FIG. 10A, two of numerous signal routes that may be formed in analog routing fabric 808 of FIG. 8 are shown by bold lines. Route 1077-0 shows how different GPIO pins 1002-2 and 1002-3 may be connected to one another by a single bus, which in the example shown is left AMUX bus 864-0. Route 1077-1 shows how different GPIO pins 1002-0 and 1002-1 may be connected to one another by a multiple different buses, which in the example shown, includes right global bus "7", left global bus "7", and left global bus "3".

Figure 10B:
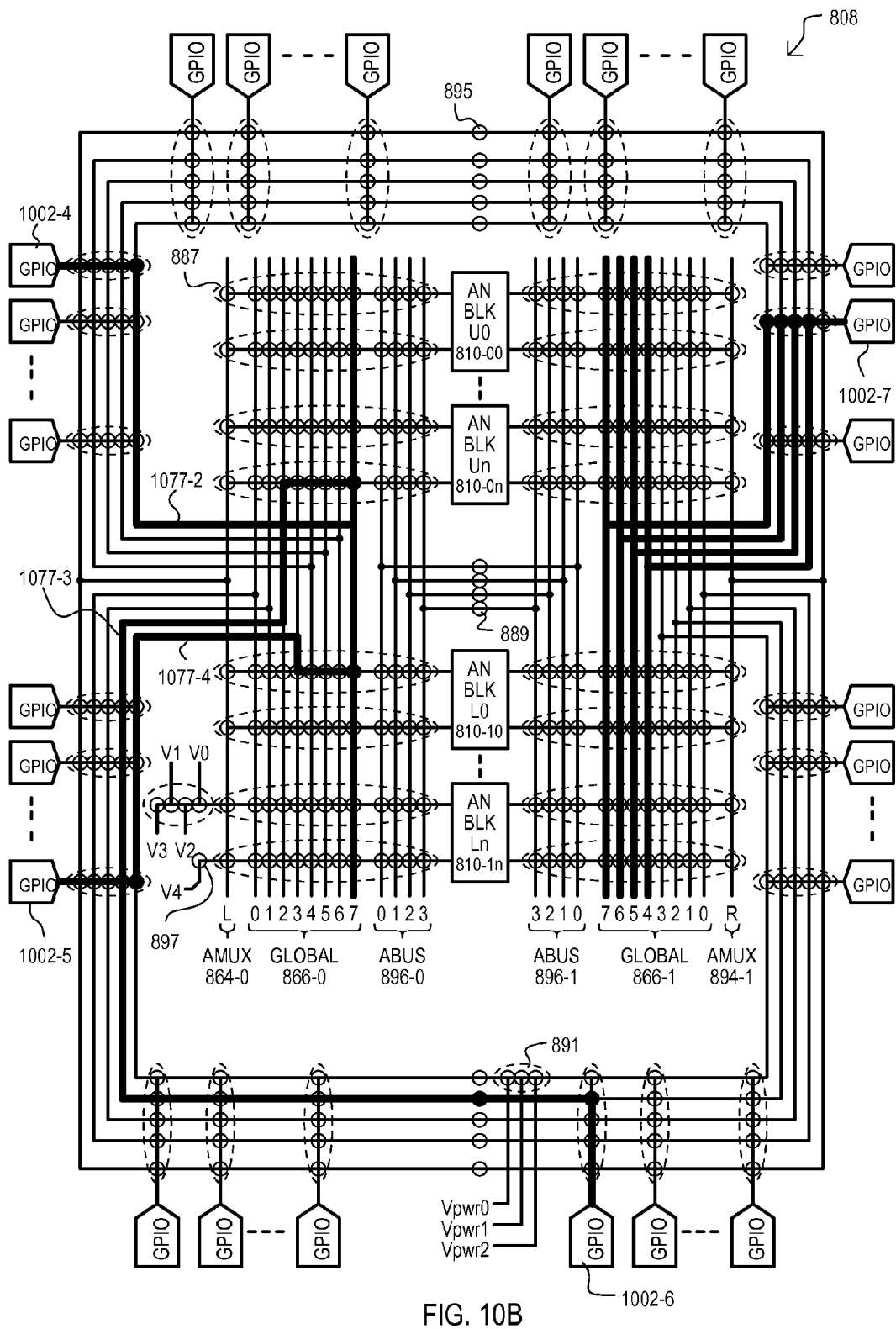

Referring to FIG. 10B, more signal routes that may be formed in analog routing fabric 808 of FIG. 8 are shown by bold lines. Routes 1077-2 to -4 shows how different GPIO pins 1002-4, -5, -6 may be connected to a same bus, which in the example is right global bus "7". FIG. 10B also shows how a single GPIO pin 1002-7 may be connected to multiple buses, which in this example are left global buses 4-7.

Figure 10C:
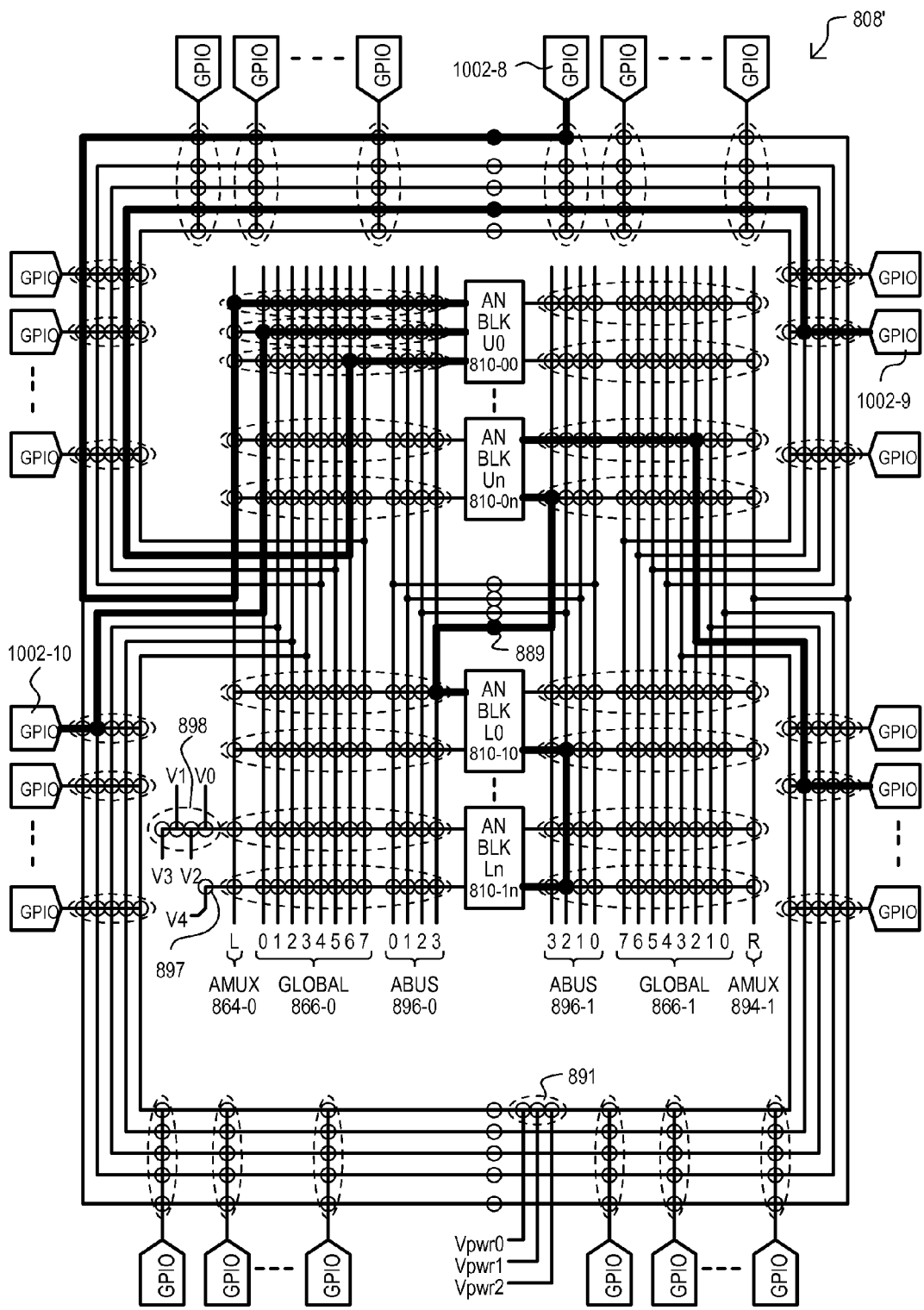

Referring to FIG. 10C, additional examples of possible signal routes in an analog routing fabric 808' like that of FIG. 8 are shown by bold lines. FIG. 10C shows how GPIO pins 1002-8 to -10 may all be connected to a same analog block 810-00 at different signal points. In particular, GPIO pin 1002-8 may be connected by right and left AMUX buses 864-0/1, GPIO pin 1002-10 may be connected by left global bus "0", and GPIO pin 1002-9 may be connected by right global bus "6" and left global bus "6".

FIG. 10C also shows how local buses may be utilized to connect analog blocks together. In the particular embodiment shown, analog blocks 810-1n and 810-10 may be connected together by right local bus "2", and analog block 810-10 and 810-0n may be connected together by left local bus "3" and right local bus "3".

Figure 10D:
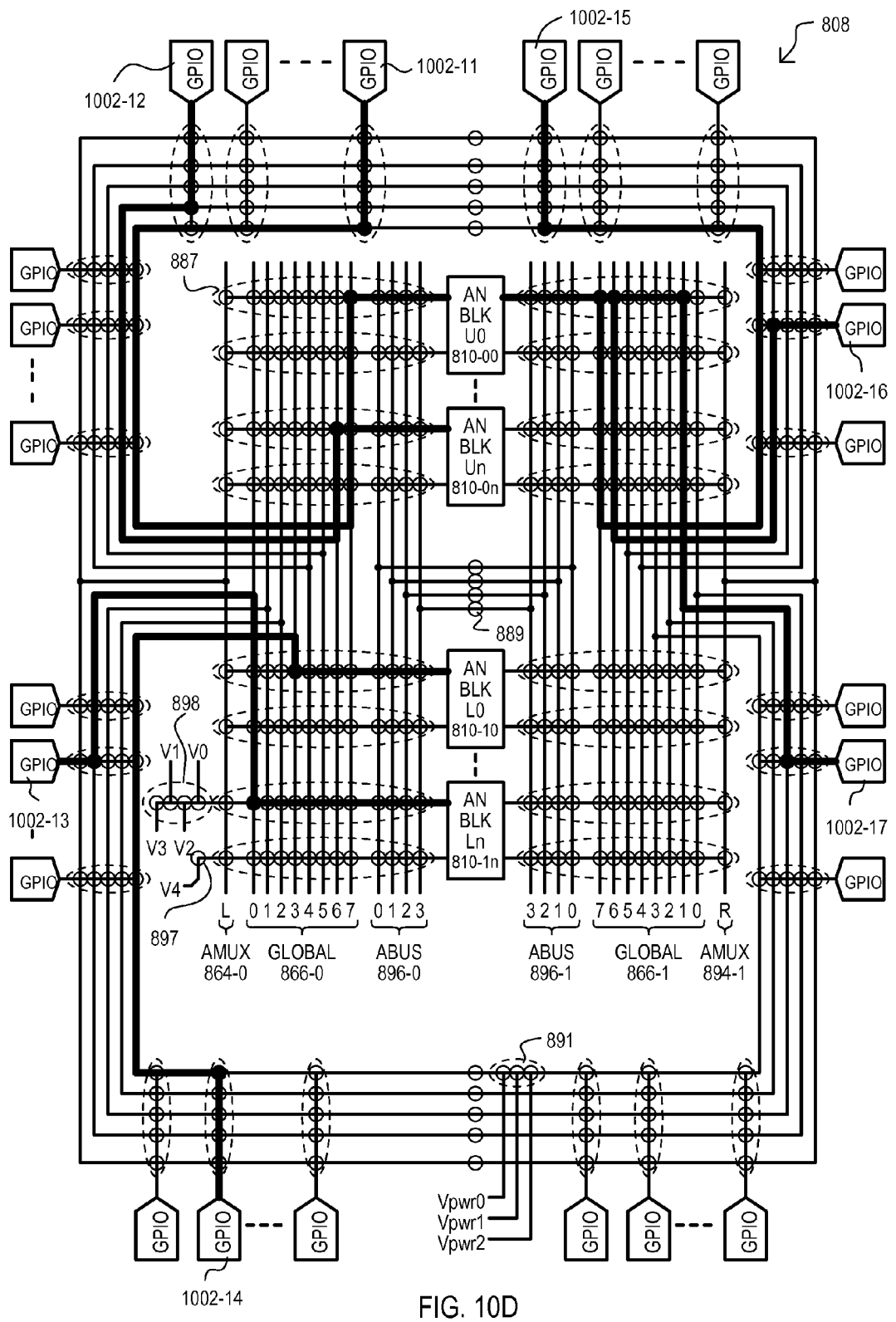

Referring now to FIG. 10D, still further examples of possible signal routes in an analog routing fabric 808 like that of FIG. 8 are shown by bold lines. FIG. 10D shows how multiple GPIO pins 1002-11 to -14 may each be connected to different analog blocks. In particular, GPIO pins 1002-11 to -14 may be connected to analog blocks 810-00, -0n, -10 and -1n, respectively.

FIG. 10D also shows how multiple GPIO pins 1002-15 to -17 may each be connected to a same analog block input or output. In particular, GPIO pins 1002-15 to -17 may all be connected to a same I/O of analog blocks 810-00.

As noted above, according to some embodiments, GPIO pins may have particular connections to buses. GPIO bus connections according to one particular embodiment are shown in FIG. 11.

Figure 11:
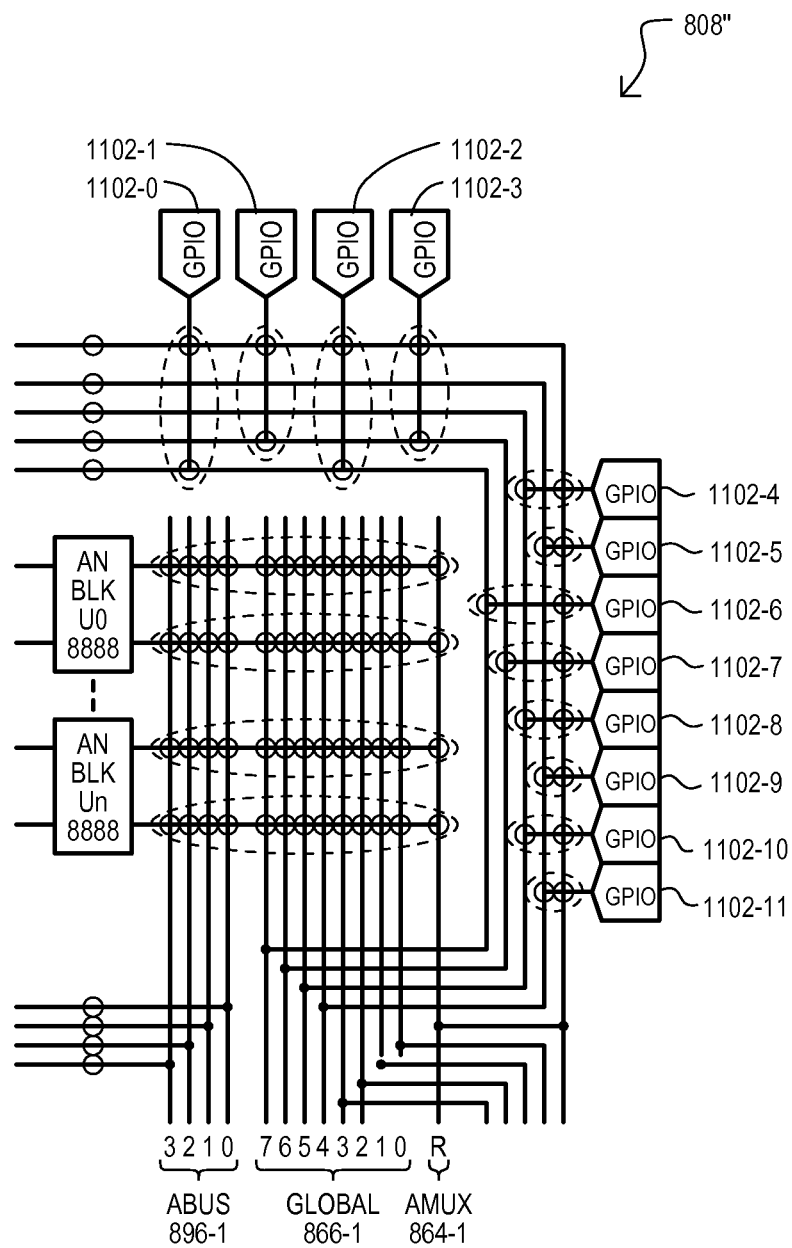
FIG. 11 is a schematic diagram showing global I/O connections to buses of an analog routing fabric according to one embodiment.

Referring to FIG. 11, a portion of an analog routing fabric like that of FIG. 8 is shown in schematic diagram and designated by the reference character 808″. FIG. 11 shows various GPIO pins 1102-0 to -11 and possible connections to buses. In particular, FIG. 11 shows how all GPIO pins 1102-0 to -11 may have a connection to a same analog MUX bus 864-1, and have connections to only selected global buses.

It should be appreciated that in the foregoing description of exemplary embodiments. Various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

It is also understood that the embodiments of the invention may be practiced in the absence of an element and/or step not specifically disclosed. That is, a feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. An integrated circuit device comprising:
a dynamically or statically reconfigurable analog signal switching fabric comprising:
a plurality of global buses configured to be selectively connected to and disconnected from external pins by pin connection circuits in response to first analog routing data; and
a plurality of local buses configured to be selectively connected to at least one of one or more analog blocks and one or more of the global buses by routing connection circuits in response to second analog routing data and in response to third analog data, to be selectively connected to a first of the one or more analog blocks and a second of the one or more analog blocks to connect the first and second analog blocks, wherein the first and second analog blocks are configured to provide an analog function, when connected to one another;
at least one processor circuit;
a programmable logic section comprising a plurality of digital programmable blocks; and
a digital system interconnect configured to provide, to the analog switching fabric, analog routing data received from the programmable logic section and analog routing data received from the at least one processor circuit.

2. The integrated circuit device of claim 1, wherein the pin connection circuits comprise switch circuits configured to selectively connect one external pin to any of the plurality of global buses in response to the analog routing data.

3. The integrated circuit device of claim 1, wherein the pin connection circuits comprise multiplexer circuits configured to selectively connect one external pin to any one of the plurality of global buses in response to the analog routing data.

4. The integrated circuit of claim 1, wherein the routing connection circuits comprise switch circuits configured to selectively connect at least one analog block to at least one of any of the local buses, and any of the global buses, in response to the analog routing data.

5. The integrated circuit of claim 1, wherein the routing connection circuits include first routing connection circuits configured to provide connections having a first impedance, and second routing connection circuits configured to provide connections having a second impedance that is less than the first impedance.

6. The integrated circuit of claim 1, wherein the local buses and global buses are shielded to reduce signal coupling therebetween.

7. The integrated circuit device of claim 1, wherein the reconfigurable analog signal switching fabric further includes at least one multiplexer (MUX) bus configured to be selectively connected to any of the external pins by the pin connection circuits and to at least one global and/or local bus by the routing connection circuits.

8. The integrated circuit of claim 1, further including a direct access circuit coupled to transfer data between the integrated circuit and a source external to the integrated circuit, wherein the digital system interconnect provides the analog routing data from the direct access circuit.

9. An integrated circuit comprising:
at least one processor circuit;
a plurality of analog circuit blocks; and
a dynamically or statically reconfigurable analog routing fabric configured to selectively connect and disconnect one or more of the plurality of analog circuit blocks with input/output (I/O) pins through I/O connection circuits in response to first analog routing data received from the at least one processor circuit from a programmable logic section comprising a plurality of digital programmable blocks formed in the integrated circuit; and to selectively connect a first analog circuit block of the plurality of analog circuit blocks with a second analog circuit block of the plurality of analog circuit blocks to provide an analog function.

10. The integrated circuit of claim 9, wherein the dynamically or statically reconfigurable analog routing fabric is configured to selectively interconnect one or more of the plurality of analog circuit blocks with input/output (I/O) pins in response to analog routing data from a direct access circuit configured to transfer data between the integrated circuit and a source external to the integrated circuit.

11. The integrated circuit of claim 9, wherein the reconfigurable analog routing fabric includes connection circuits comprised of at least one of switch circuits configured to provide connections between single fabric points and any of multiple other fabric points, and multiplexer circuits configured to provide a single connection between a single fabric point and one of multiple other fabric points.

12. The integrated circuit of claim 11, further comprising at least one voltage generation circuit configured to:
generate at least one switch voltage outside a range of power supply voltages received by the integrated circuit; and
provide the at least one switch voltage to at least one connection circuit.

13. The integrated circuit of claim 9, wherein the reconfigurable analog routing fabric includes I/O connection circuits corresponding to each of a plurality of I/O pins, each I/O connection circuit configured to selectively connect its I/O pin to at least one of a multiplexer (MUX) bus and at least one of a plurality of global buses, wherein the global buses are connectable to the analog circuit blocks through the analog routing fabric.

14. The integrated circuit of claim 9, wherein the reconfigurable analog routing fabric includes routing connection circuits, each routing connection circuit corresponding to an analog circuit block, wherein each routing connection circuit is configured to selectively connect the corresponding analog circuit block to any of a plurality of local buses, wherein the local buses are connectable to I/O pins through the analog routing fabric.

15. The integrated circuit of claim 9, wherein the analog circuit blocks include at least two of an analog signal filter, a comparator, a capacitance sensing circuit, a switched capacitor circuit, a digital-to-analog converter, an analog-to-digital converter, and an operational amplifier.

16. A method comprising:
responsive to first routing data, configuring a reconfigurable analog routing fabric on an integrated circuit to selectively enable connections and disconnections between a plurality of input/output (I/O) pins and at least one of a plurality of global buses through I/O connection circuits coupled to the plurality of I/O pins; and responsive to second routing data, configuring the reconfigurable analog routing fabric to selectively enable connections between at least one global bus and at least one of a plurality of analog circuit blocks of the integrated circuit; and responsive to third routing data, configuring the reconfigurable analog routing fabric to selectively enable connections between a plurality of local buses and at least two of the plurality of analog circuit blocks to chain at the least two analog circuit blocks together to provide an analog function, wherein the routing data is dynamically or statically provided through digital circuits of the integrated circuit, wherein routing data is provided by a processor of the integrated circuit and a plurality of digital programmable blocks formed in the integrated circuit.

17. The method of claim 16, wherein the configuring of the reconfigurable analog fabric includes selectively enabling connections between the plurality of I/O pins and a multiplexer bus, and selectively enabling connections between the multiplexer bus and at least one of the analog circuit blocks.

18. The method of claim 16, wherein routing data is provided by a direct access circuit of the integrated circuit configured to transfer data between the integrated circuit and a location external to the integrated circuit.

19. The method of claim 16, further comprising, responsive to fourth routing data, configuring the reconfigurable analog fabric to selectively enable connections between the plurality of local buses and at least another two of the plurality of the analog circuit blocks to chain at least the other two analog circuit blocks together to provide another analog function.

* * * * *